United States Patent [19]

Bloxham et al.

[11] 4,075,299

[45] Feb. 21, 1978

[54] METHOD OF MAKING RETRACTILE CORDS

[75] Inventors: Gordon Foreman Bloxham, Baltimore; Claude Paren Brezeale, Columbia; Eugene Raymond Cocco, Baltimore; Edwin Charles Hardesty, Perry Hall; Byron Lee Small, Baltimore; Daniel Marion Steinert, Dundalk, all of Md.; Charles McGonigal, Grayson, Ga.

[73] Assignee: Western Electric Company, Inc., New York, N.Y.

[21] Appl. No.: 706,729

[22] Filed: July 19, 1976

Related U.S. Application Data

[62] Division of Ser. No. 641,003, Dec. 15, 1975, Pat. No. 3,988,092.

[51] Int. Cl.[2] .................... B29C 27/20

[52] U.S. Cl. .................... 264/25; 264/159; 264/281

[58] Field of Search .................... 264/25, 145, 159, 281, 264/286

[56] References Cited

U.S. PATENT DOCUMENTS

| | | | |
|---|---|---|---|
| 1,998,560 | 4/1935 | Smith | 425/334 |
| 2,129,203 | 9/1938 | Dufour | 264/25 |
| 2,262,636 | 11/1941 | Cuno | 264/281 X |
| 2,920,348 | 1/1960 | Franke | 425/334 |
| 3,024,497 | 3/1962 | Hardesty | 425/391 |
| 3,184,795 | 5/1965 | Howell | 264/281 X |
| 3,226,767 | 1/1966 | Howell | 264/281 X |
| 3,416,743 | 12/1968 | Harrison et al. | 425/391 X |
| 3,940,228 | 2/1976 | Griffin | 425/445 X |

*Primary Examiner*—Richard R. Kucia

*Attorney, Agent, or Firm*—E. W. Somers; A. C. Schwarz, Jr.

[57] ABSTRACT

A plurality of groups of mandrels are arranged for movement successively through a plurality of workstations with each group being worked on at a station while other groups are being worked on simultaneously at other stations to produce continuously automatically groups of retractile cords. Cordage is fed from a supply into clamping engagement with each of the mandrels in the group in a cord-loading position and then wound helically in a plurality of spaced-apart convolutions on each of the mandrels of that group after which the wound cords are severed from the cordage supplies. The wound cords are advanced incrementally through a heating zone, wherein the cords are exposed to radiant heating supplemented by preheating of the mandrels, while cordage is being wound on the next successive groups of mandrels. The wound cords in each group are advanced through a cooling zone and then to an unloading station where they are removed from the mandrels while the pitch of the helices of the convolutions is reversed and the tendency of the convolutions to enlarge is minimized.

7 Claims, 21 Drawing Figures

METHOD OF MAKING RETRACTILE CORDS

CROSS-REFERENCE TO RELATED APPLICATIONS

The instant application is a division of application Ser. No. 641,003, filed on Dec. 15, 1975, now U.S. Pat. No. 3,988,092.

BACKGROUND OF THE INVENTION

1. Field of the Invention

This invention relates to the method of making of retractile cords, and more particularly, to methods for the automatic manufacture of telephone cords wherein cordage is drawn from a supply, is fed into an apparatus and is conveyed through a plurality of the apparatus so that it emerges therefrom as a retractile cord adaptable for subsequent end finishing.

2. Description of the Prior Art

Retractile telephone cords, commonly referred to as spring cords, are widely used in the communications industry. For example, retractile cords are used to connect the handset of a telephone instrument to the telephone base. The spring cord is manufactured with the major portion thereof in the form of a compact helical cord, which may be extended by slight tension and which will return to the compact form when the tension is relieved.

The process of manufacturing spring cords by manual operation is well known and is described, for example, in U.S. Pat. No. 3,024,497 issued on Mar. 13, 1962 to E. C. Hardesty and D. L. Myers; the structure of the retractile cord is shown, for example, in U.S. Pat. No. 3,037,068 issued on May 29, 1962 to H. L. Wessel; and cord manufacturing apparatus is shown in E. L. Franke, Jr. U.S. Pat. No. 2,920,348 issued on Jan. 12, 1960, all incorporated by reference hereinto.

Generally, the manufacture of spring cords in the past has involved an operator who coils cordage from a fixed feed-in point onto a longitudinally moving mandrel after which the operator stacks a plurality of the mandrels in a rack which is conveyed in succession through an oven and a cooling chamber. Subsequently, the operator places each of the mandrels in an apparatus and then removes the cord from the mandrel while reversing the pitch of the helices of the cord to cause the spring cord to have a permanent and improved retractility.

Improved methods for stretching a spring cord by controlled varying amounts during helix reversing and overtwisting operations are disclosed in U.S. Pat. No. 3,087,199 issued on Apr. 30, 1963 to E. L. Franke, Jr. et al.

It is known to remove heat-treated spring cords from associated mandrels and to reverse the pitch of the helices of the coils by mounting a plurality of mandrels vertically and rotatably in a spaced-parallel array. A reciprocally movable carriage having a plurality of spindles rotatably mounted thereon is supported from a frame with each of the spindles aligned with an associated one of the mandrels. The carriage is moved from the mandrel to unwind the spring cords from the associated mandrels. Simultaneously, the spindles may be rotated in such a manner as to reverse the pitch of the helix of the spring cords being unwound from the mandrels.

As the carriage is moved relative to the mandrel to uncoil the cord, successive sections of the cord are moved axially, horizontally, and generally perpendicular to a stationary plate positioned between the mandrel and the carriage so that portions of the cord adjacent to the trailing end thereof are moved into and pulled through an associated slot formed in the plate. As the trailing end of the cord is disengaged from the mandrel, the last few convolutions of the cord spring together and expand radially on the mandrel-side of the plate thereby preventing the cordage from being pulled further through the slot. This is effective in retaining the last few convultions of the cords on the mandrel-side of the plate to maintain the cords unentangled and strung out between the spindle and the plate to facilitate removal. See U.S. Pat. No. 3,656,516 issued Apr. 18, 1972 in the name of E. C. Hardesty.

There have been attempts to construct an apparatus which may overcome the many manual steps involved in the well known techniques of making spring cords. For example, see U.S. Pat. Nos. 2,173,096, 2,525,285, 2,547,356, 2,718,660, 2,804,647. See also U.S. Pat. No. 2,898,630 issued Aug. 11, 1959 to G. P. Adams.

In U.S. Pat. No. 3,226,767, a leading end of cordage is attached to a mandrel which is then rolled along a magnetic track while winding convolutions on the mandrel. Subsequently, the mandrel is advanced through a heating zone, which comprises radiant heating elements or other heating means such as banks of infrared bulbs or facilities for induction heating of the mandrel. The mandrel is conveyed through a cooling zone and then to a reverse removing station whereat a released end of the coiled cordage is inserted into an unwinding mandrel with the mandrels driven in opposite directions to unwind the cord from one mandrel and reverse coil it onto the other. The reverse-coiled cord is removed from the mandrel by an axially sliding movement of the length toward and past the free end of the mandrel. See also U.S. Pat. No. 3,184,795, which interposes a blade-like member between adjacent ones of the convolutions being wound on a longitudinally moved mandrel to space the convolutions.

It has long been desired to provide a method which may be used to produce retractile cords at a high rate of production with the use of minimum floor space in order to realize manufacturing economies and to produce uniformly coiled heatset cords having uniform characteristics.

SUMMARY OF THE INVENTION

With these and other objects in mind, the present invention contemplates the method of making of retractile cordage by advancing a leading end of each of a plurality of cordage supplies into clamping engagement with an associated mandrel included in a group of mandrels of a leading one of a plurality of workholders mounted on a conveyor. The cordage is wound in a plurality of spaced-apart convolutions on each mandrel in a cord-loading position after which the wound cordage is severed from the supply in a manner to preclude a pullback of the conductors within the jacket at the newly formed cord end. The group of coiled cords is indexed through a heating zone whereat the mandrels are preheated to supplement subsequent exposure of the wound cords to radiant heat with the spacing apart of the convolutions enhancing the efficiency of the heating. Simultaneously, the next successive one of the workholders is advanced into the cord-loading position where cordage wound on each of the mandrels.

The group of coiled cords is advanced successively through a cooling zone and to a remove-reverse station whereat the free end of each cord is grasped and moved laterally, obliquely of the associated mandrel. This causes the pitch of the helices to be reversed in a manner to minimize enlargement of the helices of the cord which improves the retractile properties of the cord. As the last few convulutions are removed from each mandrel, the cord is drawn through an associated slot of a plate. Since the enlarged helices are incapable of being drawn through the slot, the trailing end portion of each end engages the flat side of the plate as the cord springs from the mandrel and the trailing end is released from the mandrel and grasping mechanism.

More particularly, a leading end of each of a plurality of supplies of retractile cordage is advanced by a feeding mechanism into engagement with each of a plurality of clamping devices mounted on associated ones of a plurality of mandrel which are mounted in groups on an endless conveyor in parallel relationship. Following the clamping of the leading end of each of the cordage supplies with the associated mandrel, the feeding mechanism traverses the mandrels to coil a predetermined number of spaced-apart convulutions on each mandrel in a cord-loading position. Following the coiling, the last convolution is secured to its associated mandrel and each of the wound cords is severed from the associated supply by a cutting device such that the conductors of the new leading end of each cordage supply are flush with the free end of the jacket. The group of coiled cords are then indexed through a heating station in which the mandrels are preheated inductively to heat the inwardly facing surfaces of the convolutions of each cord. Subsequently, the group of mandrels is indexed through a portion of the heating station where radiant heat is applied to the outwardly facing surfaces of the convolutions. While the heating of the initial group of mandrels and cordages is occurring, the next successive group of mandrels in the cord-loading position is in the process of having cordage wound thereon. The group of coiled heated cords is then advanced successively through a cooling station, oriented and then advanced to a remove-reverse station. At the remove-reverse station a plurality of grasping jaws engage trailing ends of the cords wound on the associated mandrels. The grasping jaws are then moved as a group transversely obliquely of the axes of the mandrels thereby causing the convolutions to be unwound from the mandrels. Simultaneously, the mandrels are rotated individually in a direction such that the rotation thereof together with the rotation of the grasping jaws causes a reversing of the pitch of the helices. The removing and the reversing is accomplished with the successive sections of each cord being advanced past a device which controls the pulling forces applied to the cord to minimize any enlargement of the helices. The last few convolutions of each cord are caused to be guided through an associated slot of a plate such that the trailing end portion of each of the cords engages the flat side of the plate as the trailing end is released from its grasping jaws. This causes the cord to be caught and retained to facilitate removal from the apparatus by an operator.

BRIEF DESCRIPTION OF THE DRAWINGS

Other objects and features of the present invention will be more readily understood from the following detailed description of specific embodiments thereof when read in conjunction with the accompanying drawings, in which.

DETAILED DESCRIPTION

Product Produced by Methods

Figure 1A:
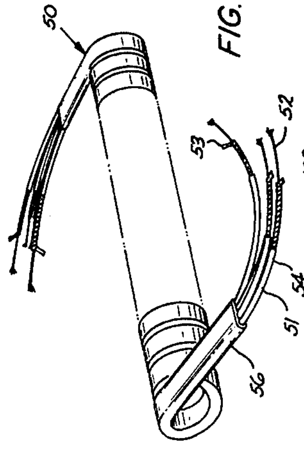
FIG. 1(A) is a perspective view of a retractile cord and showing details of the structure thereof.

Electrical retractile cords which are used in connecting, for example, portions of a telephone instrument are shown for example, in U.S. Pat. Nos. 2,413,715 and 3,553,042. An electrical retractile cord 50 (see FIG. 1(A)) which is to be manufactured in accordance with the methods of this invention includes a plurality of individually insulated conductors 51—51. Each conductor 51 includes a center core 52 made, for example, of nylon and has a tinsel ribbon 53 wrapped thereabout. The ribbon 53 has a layer of insulation 54 extruded thereover. The plurality of conductors 51—51 are jacketed with an insulative covering 56, which typically is polyvinyl chloride, to provide a flat cord 50 having a cross section in which the sides are parallel joined by generally semi-circular end sections.

Typically, the inner diameter of the convolutions of the retractile cord 50 is approximately 0.375 inch. The major distance across the cross section of the jacketed conductors, which comprise the cord cross section is approximately 0.20 inch.

In a process for continuously automatically manufacturing retractile cords, commonly referred to as spring cords, a desired length of jacketed, multiconductor cordage 60 from a supply 61 is wound in a helix along the length of a rotating and longitudinally moving mandrel 160. The cord is heated on the mandrel 160 to a temperature above the softening point of the jacketing composition, to relieve strains in the jacketing material and to impart a helical set to the cord after which the cord 50 is cooled to room temperature. After cooling, the heat-treated cord 50 is removed from the mandrel 160 and the pitch of the helix is reversed in order to provide a spring cord having greater retractility. See U.S. Pat. Nos. 2,920,348, 2,920,351 and 3,087,199, exemplarly prior art.

Overall

Figure 1:
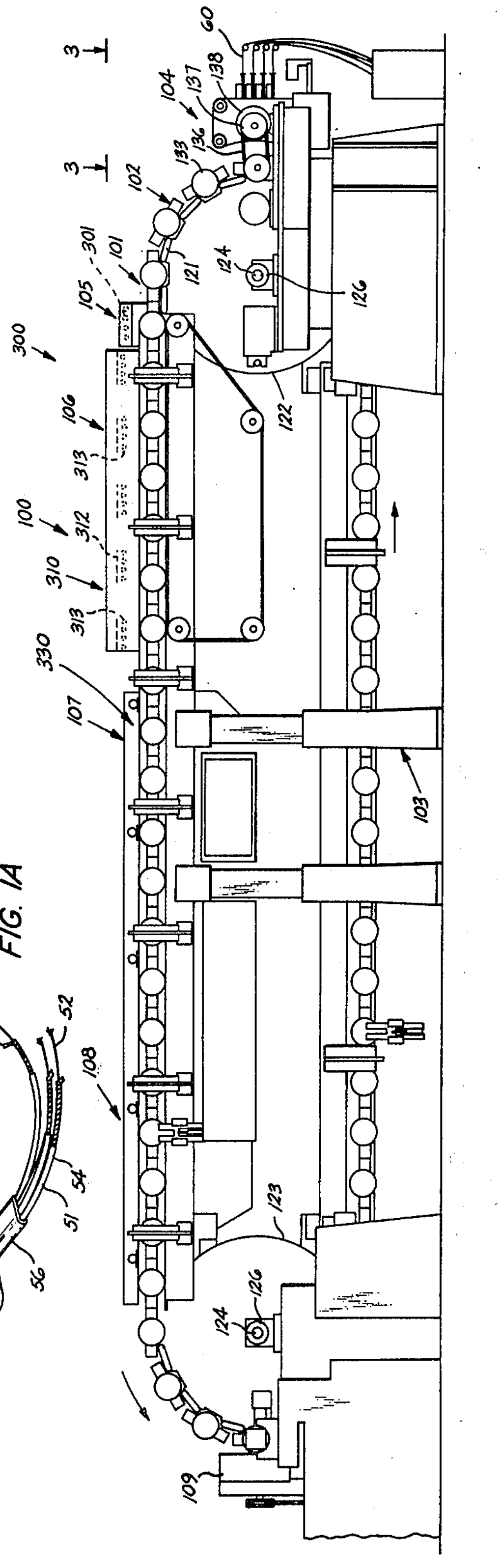
FIG. 1 is an elevational view illustrating an apparatus for carrying and the methods of this invention for manufacturing retractile cords.

An apparatus for performing the method which embodies the principles of this invention is designated generally by the numeral 100 and is shown in FIG. 1. The apparatus 100 includes an endless conveyor, designated generally by the numeral 101 and having a plurality of workholders 102—102. The conveyor 101 is mounted on a frame 103 to advance each of the workholders 102—102 through a pluraluty of work stations which include in seriatim, a cord-coiling station 104, a workholder preheat station 105, a cord-heating station 106, a cord-cooling station 107, a workholder-alignment station 108, and a cord remove-reversal station 109.

Conveyor and Workholders

As can be seen in FIG. 1, the conveyor 101 is comprised of a plurality of links 121—121 which are interconnected through the workholders 102—102 in an endless path and supported about portions of the peripheries of spaced sprockets 122 and 123. The sprockets 122 and 123 are mounted rotatably on shafts 124—124 supported in bearings 126—126 which are held in the frame 103. A plurality of interconnected sprockets 128—128, which comprise the conveyor 101 are adapted to be indexed through an incremental distance by a motor 127 (see FIG. 20) mounted on the frame 103 and connected through appropriate linkage to one of the sprockets 122 and 123.

Figure 3:
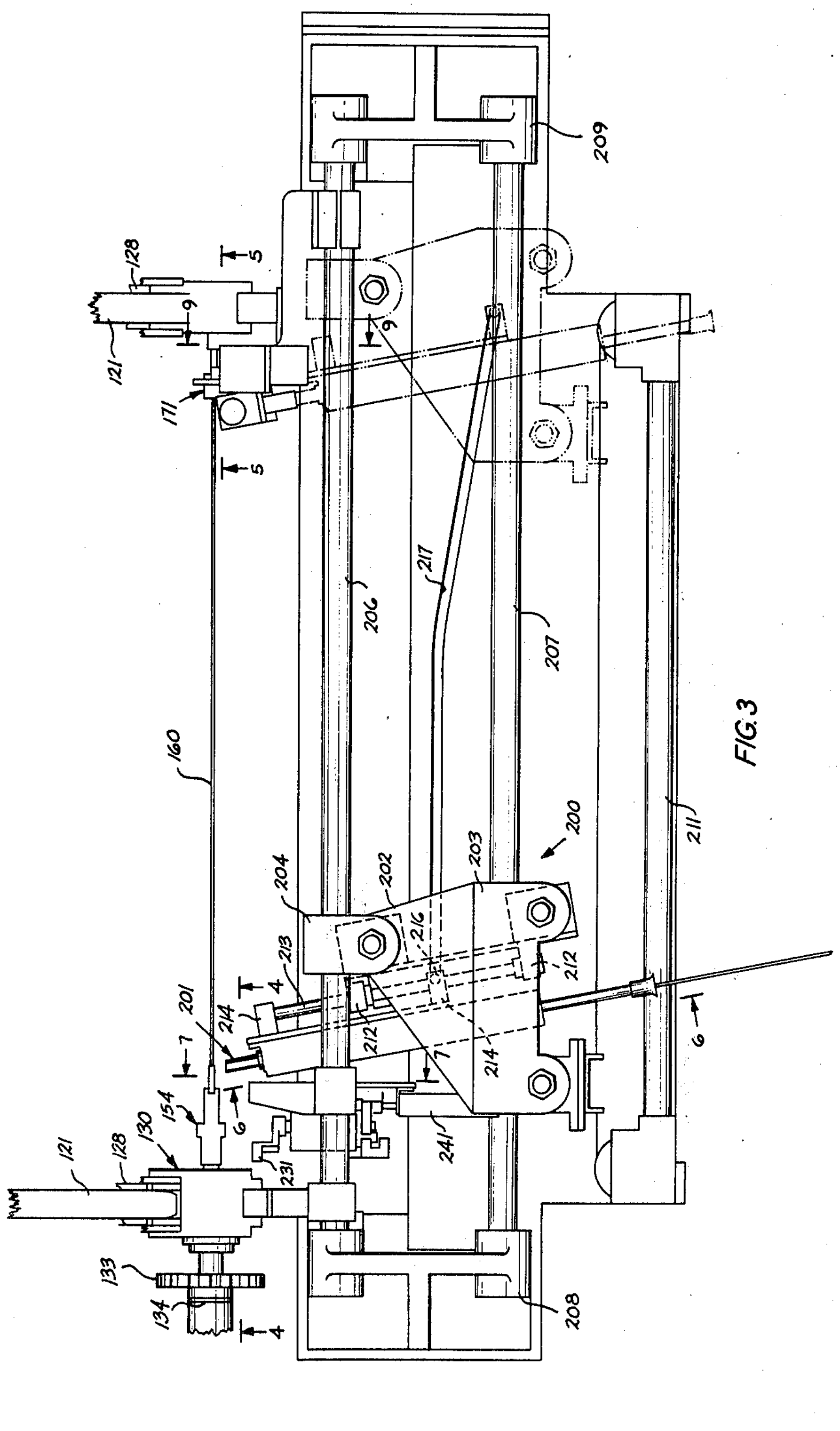
FIG. 3 is a plan view taken along lines 3—3 of FIG. 1 and showing details of a cord-coiling position of the apparatus of FIG. 1.

Referring now to FIG. 3, it can be observed that each adjacent pair of links 121—121 are pin-connected to a drive head 130 of one of the workholders 102—102. The head 130 includes a bearing 131 (see FIG. 4) having a drive shaft 132 extending therethrough with an outer end thereof connected to a sprocket 133. The sprocket 133 is adapted to be engaged by a clutch face 134 which is turned rotatably by a belt 136 passed around a pulley 137 of a motor 138 (see FIG. 1).

Figure 4:
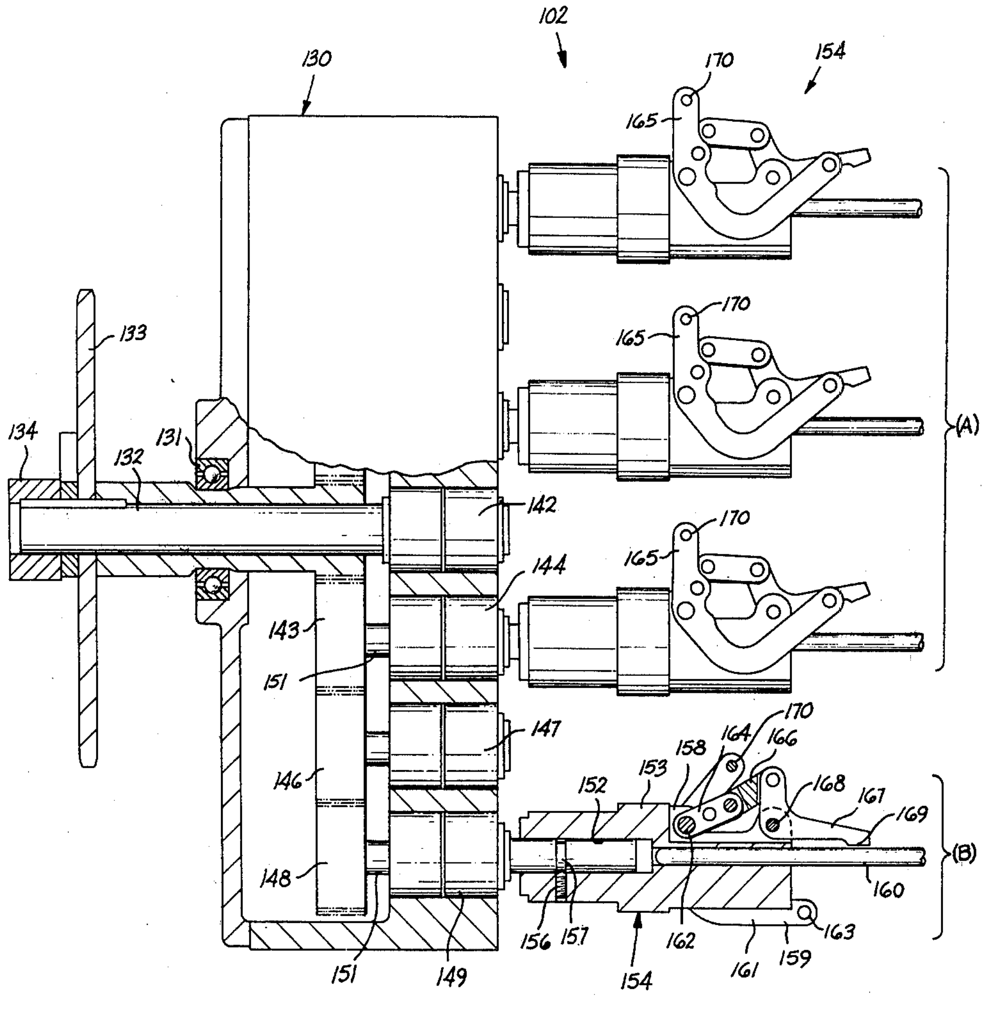
FIG. 4 is an end elevational view taken along lines 4—4 of FIG. 3 partially in section and showing one end of a group of mandrels which comprise one of a plurality of workholders mounted on an endless conveyor with a portion FIG. 4(A) further showing three of the four mandrels of the group in an unoperated position for clamping a leading end of cordage to be wound on the mandrel and a portion FIG. 4(B) showing the clamping facilities of the fourth mandrel in an operated position for purposes of clarity.

Turning now to FIGS. 3 and 4, it can be seen that the drive shaft 132 mounted rotatably in the bearing 131 extends into the head 130 and is attached to a main gear 141 and has the other end thereof received in a bearing 142. The main gear 141 is intermeshed directly with a first pair of drive gears 143—143 which are associated with bearings 144—144, and through a pair of secondary gears 146—146, which are supported in bearings 147—147, to a second set of drive gears 148—148 that are aligned with bearings 149—149.

A separate shaft 151 extends through each of the gears 143—143 and 148—148 and then extends through each of the aligned associated bearings 144—144 and 149—149 and then externally of the head 130. Each of the shafts 151—151 supports one end of apparatus on which the cord 50 is to be coiled. Since the inner end of each of the shafts 151—151 is attached to the associated one of the gears 143—143 and 148—148, the rotation of the gears through the gear drive train causes the shafts 151—151 to be turned rotatably.

In order to describe one of the coiling apparatus, reference is made to FIG. 4. The end of each of the shafts 151—151, which extends from the head 130, is received in a stepped bore 152 of a housing 153 of a toggle clamp assembly, designated generally by the numeral 154. The shaft 151 is held within the housing 153 by a fastener 156 engaging a necked-down portion 157 of the shaft 151. In the other end of the stepped bore 152, there is received in a press fit one end of a mandrel 160 on which the cordage is to be coiled.

Figure 2:
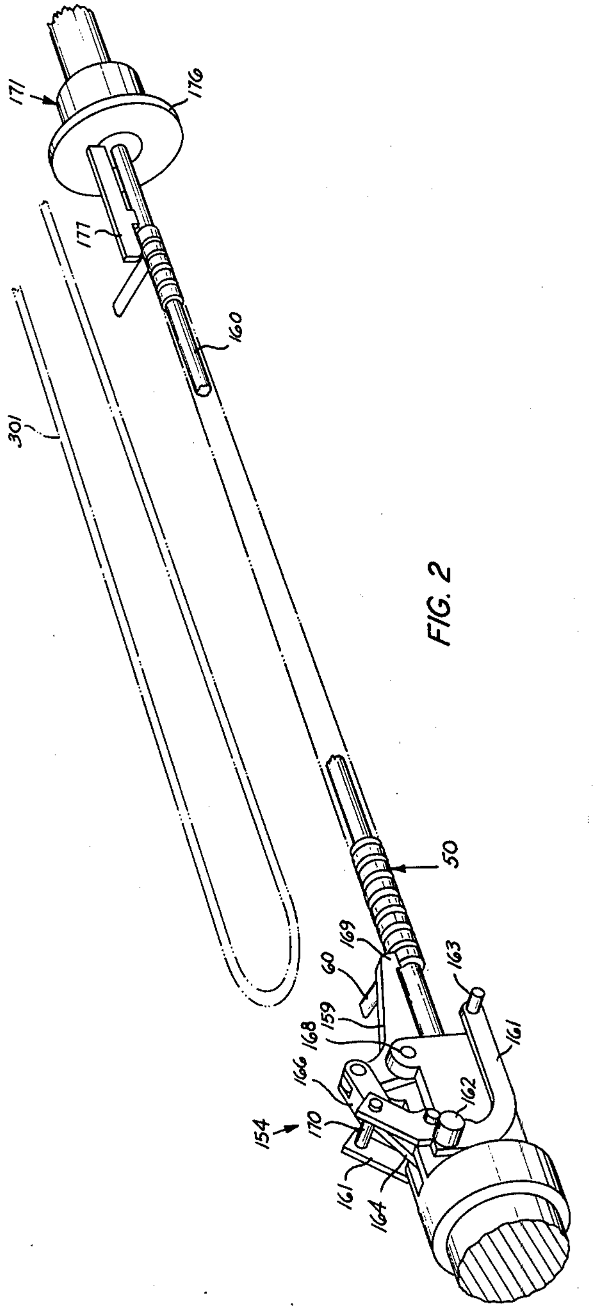
FIG. 2 is a perspective view of a mandrel with the cord wound thereon and showing facilities for clamping each end of the cord and the orientation of facilities in a heating station relative to the mandrel for preheating the mandrel.

The toggle clamp assembly 154 has provisions for clamping a leading end portion of cordage which is wound on the mandrel 160. A pair of spaced crank arms 161—161 (see FIGS. 2 and 4) are mounted pivotally to a bifurcated portion 158 of the housing 153 of the toggle clamp assembly 154 by a shaft 162 with one end 159 of each of the arms having a stud 163 extending laterally thereof. Further, as can be seen by the lower one of the toggle clamp assemblies in FIG. 4, a link 164 is connected to the shaft 162 and pin connected to a second H-shaped link 166. The H-shaped link 166 is pinconnected to an L-shaped lever 167, which is mounted pivotally to the housing 153 by a pin 168. An end 169 of the lever 167 is effective to clamp to a leading end of the cordage in engagement with the mandrel 160. Opposite ends 165—165 of the arms 161—161 are connected together by a pin 170.

Figure 5:
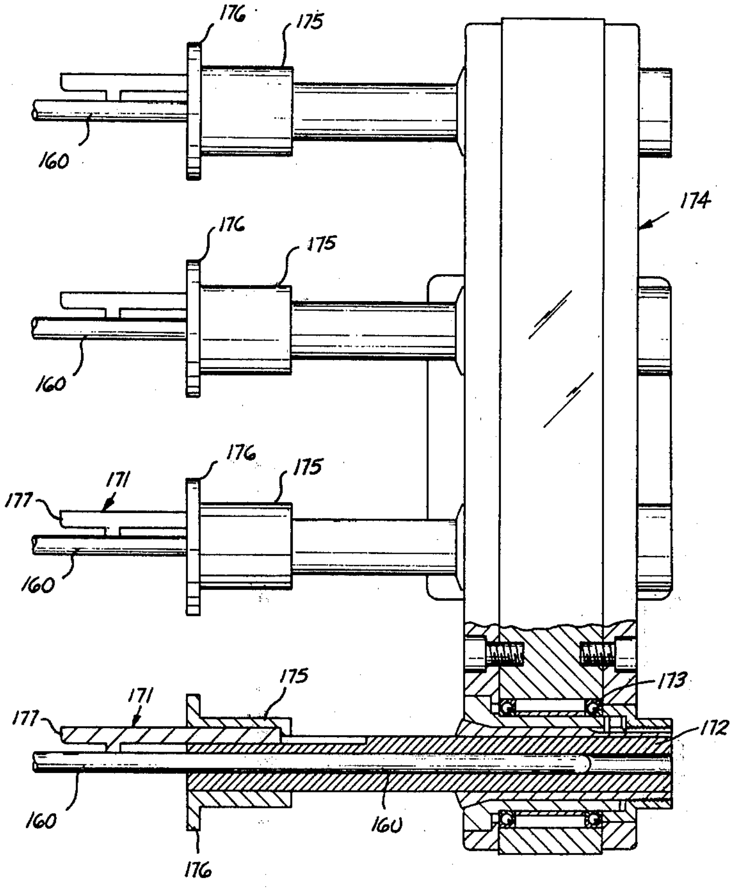
FIG. 5 is an end elevational view taken along lines 5—5 of FIG. 3 and showing the other end of each of the group of mandrels of the workholder in the cord-coiling position with facilities for clamping the trailing end of the cordage.

The opposite end of each mandrel 160 extends through an end-of-coiling clamp assembly, designated generally by the numeral 171 (see FIGS. 2 and 5) into a sleeve 172 mounted rotatably in a bearing 173 of a support head, designated generally by the numeral 174. The support head 174 is interconnected to adjacent ones of the plurality of links 121—121 on the opposite side of the conveyor 101.

The clamp assembly 171 has a portion 175 thereof adapted to be moved slidably with the sleeve 172 relative to the mandrel 160 and includes a flanged hub 176 having the one portion 177 which extends beyond the end of the sleeve. The portion 177 of the clamp assembly 171 is adapted to be moved to an operative position such that the portion 177 is moved over a last one or ones of the convolutions. As this occurs, severing facilities to be described hereinafter are controlled to form a trailing end of the cordage 60. Because of its resilience, the newly formed trailing end of the cordage 60 which initially extends to the left, as viewed in FIG. 9, toward the associated supply 61, whips about the mandrel 160 in a counterclockwise direction until it extends to the right as viewed in FIG. 9. This orientation becomes important during the subsequent remove-reversing process. It is also well to recall that the leading end of the cordage (see FIG. 2) extends in the same direction as the trailing end thereof.

Cord Coiling

An apparatus, designed generally by the numeral 200, is provided in the cord-coiling station 104 for coiling cordage from each of a plurality of supplies onto a plurality of the mandrels 160—160 associated with each of the workholders 102—102, which are advanced into the cord coiling station. It should be observed from FIG. 4 that the mandrels 160—160 of the workholder 102 in the cord-coiling station 104 are parallel and aligned in a vertical plane.

Figure 6:
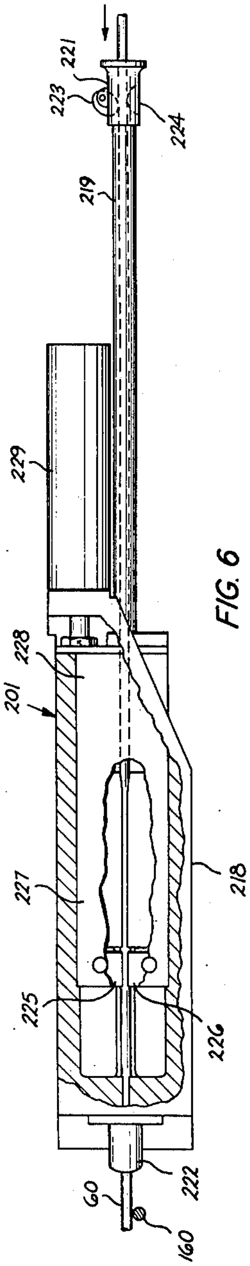
FIG. 6 is a detail view of one of a plurality of feed nozzles for feeding a supply of cordage into engagement with an associated mandrel in the cord-coiling position.

The cord-winding or cord-coiling apparatus 200 includes a cordage-feeding device 201, which is best seen in FIGS. 3 and 6. The cord-feeding device 201 is mounted on a carriage 202, which is supported slidably by a bracket 203 and a bracket 204 from parallel rods 206 and 207, respectively. The rods 206 and 207 are mounted in end supports 208 and 209 which comprise the frame 103. The carriage 202 is adapted to be moved along the length of the mandrels 160—160 of the workholder 102 in the cord-coiling position by a cable cylinder arrangement 211. This facilitates the winding of spaced-apart convolutions of the cordage along the length of each of the mandrels 160—160.

The carriage 202 includes a pair of spaced bearings 212—212 attached thereto for supporting slidably a rod 213. The rod 213 also extends through a pair of spaced bearings 214—214, which are attached to and movable with the rod. Further, one of the bearings 214—214 has a stud follower 216 upstanding therefrom and received in a cam slot 217. As the carriage 202 is moved to the right by the cable cylinder 211 in FIG. 3, the follower 216 is moved along the slot 217 and causes the rod 213 to be moved slidably within the bearings 212—212 from the mandrel 160. This movement assumes importance during the severance of the wound cordage 60 from the supplies thereof.

The cordage feeding device 201 associated with each of the mandrels 160—160 is best seen in FIG. 6 and includes a housing 218 having a tube 219 with a flared inlet 221 at the cordage-input end and a feed nozzle 222 at the output end thereof. The feeding device 201 further includes an eccentrically mounted snubber 223, which cooperates with a block 224 to prevent retrograde movement of the cordage 60. The cordage 60 extends through the housing 221 between the block 224 and the snubber 223 and between an opposed pivotally mounted pawl 225 and an anvil 226, which are adjustable to grip slightly the cordage between. It should be understood that since the cordage 60 is being pulled from barrel supplies 61—61, there is a slight back tension on the cordage.

The pawl 225 and the anvil 226 are mounted at end portions of plates 227—227 which are movable reciprocally by a piston rod 228 of an air cylinder 229 that is operated to move the pawl 225 and the anvil 226 and hence the cordage gripped therebetween to the left as viewed in FIG. 6 into engagement with the associated mandrel 160. A portion of the apparatus 200 to be described hereafter causes the lever 167 to be moved pivotally to cause the end portion 160 thereof to clamp the leading end portion of the cordage 60 in engagement with the mandrel 160. Then the air cylinder 229 is operated to withdraw the rod 228 to the right as viewed in FIG. 6. Since the pawl 225 and the anvil 226 are only in slight gripping engagement with the cordage 60, they are moved easily to the right and further permit sections of the cordage to be fed therethrough for coiling onto the mandrel 160.

In the alternative, the pawl 225 could be cammed open prior to a retrograde movement and then cammed closed prior to advancing the jaws to move the leading end into engagement with the mandrel 160.

Figure 8:
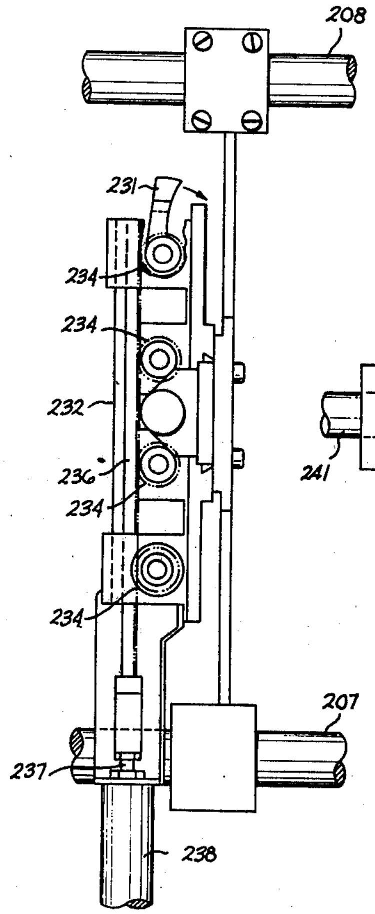
FIGS. 7 and 8 are side and end elevational views, respectively, of facilities in the cord-coiling position for acutuating the facilities for clamping the leading ends of the cordage.
Figure 7:
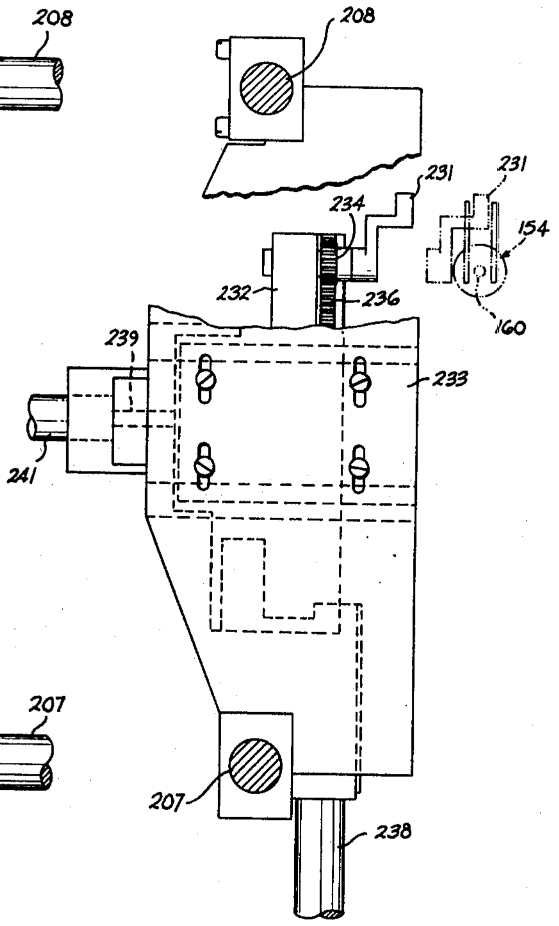

The portion of the apparatus 200 which causes the clamping of the leading end portion of the cordage 60 with the associated mandrel 160 is best seen in FIGS. 3, 7 and 8. A plurality of cranks 231—231 are mounted individually pivotally on a bar 232 which is attached to a plate 233 supported from the frame 103. A pinion 234 is attached to the end portion of each of the cranks, which extend through the bar 232.

In order to turn the cranks 231—121 in unison, a rack 236 is disposed in juxtaposition with the bar 232 so that the serrations (not shown) thereof intermesh with the gear teeth of the pinions 234—234. The rack 236 is connected to a piston rod 237 extending from an air cylinder 238. Operation of the air cylinder 238 causes the rack 236 to be moved upwardly, as viewed in FIGS. 7 and 8, thereby moving rotatably the pinions 234—234 to turn pivotally the associated ones of the cranks 231—231.

As will be seen in FIG. 3, the crank arms 231-231 (which are aligned vertically in FIG. 1) are spaced from the crank arms 161—161 of the associated mandrels 160—160. In order to clamp the leading end portions of each supply of the cordage 60 with the associated mandrel 160, the crank arms 161—161 must be turned clockwise as viewed in FIG. 4 by the cranks 231—231. To facilitate the engagement of the cranks 231—231 with the crank arms 161—161, the support plate 233 is attached to and supported from a piston rod 239 extending from an air cylinder 241. The operation of the air cylinder 241 causes the plate 233 to be moved to the right as viewed in FIG. 7 to dispose the cranks 231-231 adjacent the associated ones of the crank arms 161-161. Then the air cylinder 238 is operated to move slidaby the rack 236 to cause the above-described turning of the cranks into engagement with the portions 163—163 (see FIG. 4) of the toggle clamp assemblies 154—154 and the accompanying clamping of the leading end portions of the cordages 60—60.

Following the severing of the leading end portions of each supply 61 of the cordage 60 in engagement with the associated mandrel 160 in the cord-loading station 104, the carriage 202 is caused to be moved along the rods 206 and 207 to wind a plurality of spaced-apart convolutions of cordage on each mandrel. Preferably, the adjacent convolutions are spaced apart approximately 0.040 inch with the convolutions being on approximately center to center or pitch distances of 0.240 inch. The spacing apart of the convolutions advantageously improves the heating and the cooling of the wound cords 50—50 by exposing the curved side surfaces of the so-called flat cords. Moreover, the spacing is important in preventing the undesired sticking together of adjacent convolutions thereby facilitating the removal of the cords 50—50 from the mandrels 160-160.

The spacing apart of the convolutions of the cords 50—50 is accomplished by coiling a predetermined number of convolutions on each of the mandrels 160-160 by a predetermined velocity of traverse of the carriage 202 along the rods 206 and 207 in cooperation with a predetermined rotation of each of the mandrels.

Figure 9:
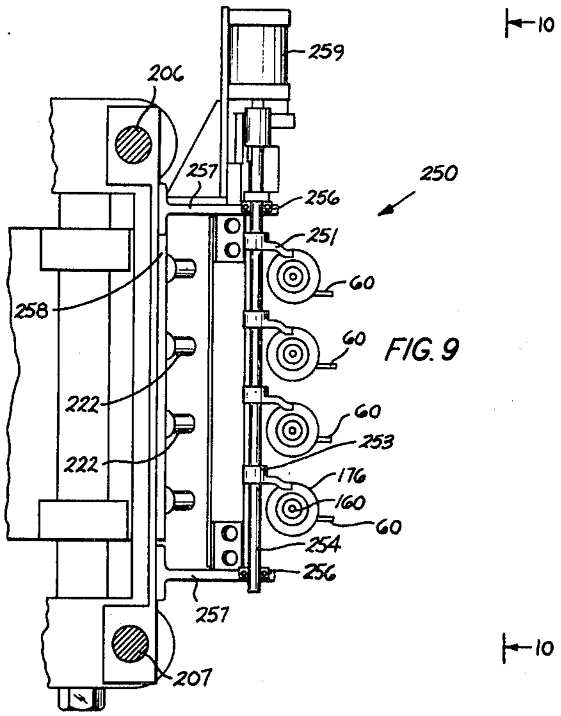
FIG. 9 is a side elevational view taken along lines 9—9 of FIG. 3 and showing facilities for operating the facilities for clamping the trailing ends of the wound cordage.
Figure 10:
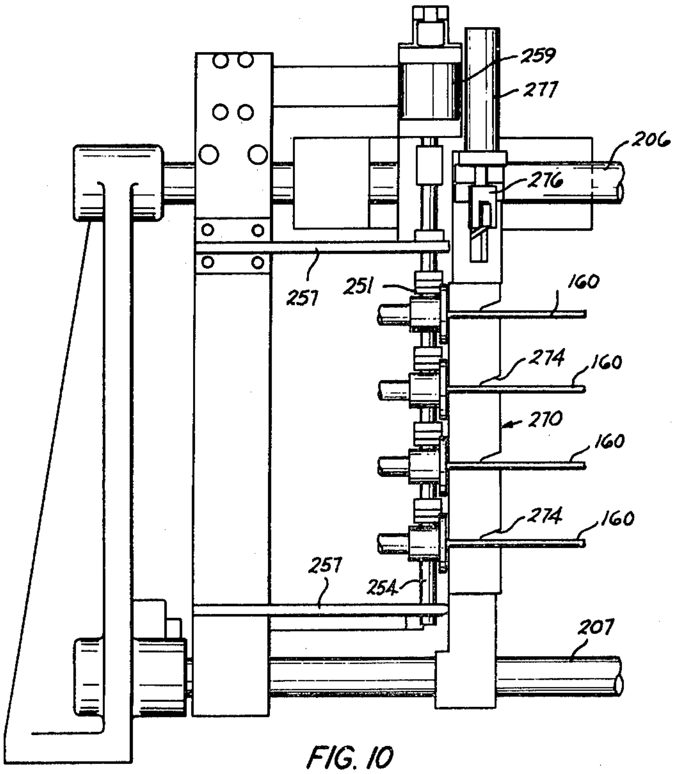
FIG. 10 is an end view taken along lines 10—10 of FIG. 9 and showing further the facilities for actuating the trailing end clamping facilities and facilities for severing the wound cordage from the associated supplies.

Further, the cord-coiler apparatus 200 includes a device, designated generally by the numeral 250 and best seen in FIGS. 9 and 10, for causing the clamp assembly 171 to engage the newly formed trailing end portion of the wound cordage. A plurality of forked fingers 251—251 and end fingers 252—252 extend from bushings 253 connected to a vertical shaft 254 which is rotatably mounted on spaced bearings 256—256 held in brackets 257 cantilevered out from a portion 258 of the frame 103 in which the rods 206 and 207 are supported. An upper end of the shaft 254 is operatively connected to a rotary air cylinder motor 259 such as one available under the designation "ROTAC". The operation of the motor 259 causes the shaft to be turned through ninety degrees to move the fingers 251 and 252 into engagement with the hubs 176—176 of the associated double clamp assemblies.

The completion of the turning of the shaft 254 causes the end portions 177—177 of the hubs 176—176 to be moved over the last one or ones of the convolutions of the wound cordage 60 on the associated mandrels 160—160. Then the severence of each wound cordage 60 from the supply thereof results in a cordage 60 wound on the associated mandrel 160 with the leading end thereof held in engagement with the mandrel by the end 169 of the lever 167 (see FIG. 4) and the last one or ones of the convolutions captured held under the associated portion 177 of the hub 176.

Following the completion of the traverse of the carriage 202 along the rods 206 and 207 to the extreme right position shown in FIG. 3, and the operation of the clamp assemblies 170—170, it becomes necessary to sever the cordage 60 wound on each mandrel 160 from the supply thereof with each newly formed trailing end in engagement with its associated mandrel. As can be seen in FIG. 3, the housing 221 of the cord-feeding device 201 has been moved in a retrograde direction to the position shown in phantom when the carriage 201 has completed the traverse of the mandrels 160—160.

Figure 11:
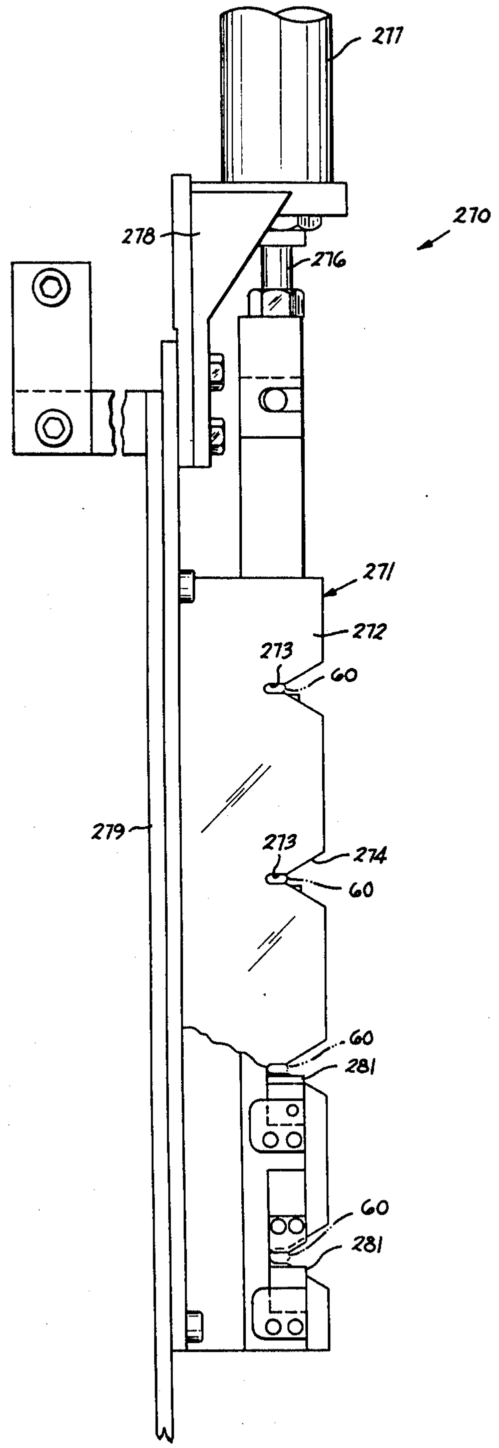
FIG. 11 is an enlarged elevational view of the cordage severing facilities.

The severance of the cord 50 associated with each mandrel 160 from the supply 61 thereof is accomplished by the apparatus shown in FIG. 11 and designated generally by the numeral 270. The severing apparatus 270 includes two similarly constructed severing devices 271—271 each of which includes a slidably mounted plate 272 having a plurality of cordage receiving slots 273—273 formed therein with each slot having a flared opening 274.

The plate 272 is attached to a piston rod assembly 276 extending from an air cylinder 277 mounted on a bracket 278 attached to a portion 279 of the general frame 103. A plurality of blades 281-13 281 are attached to a plate, which is stationary, is connected to the portion 279 of the frame 103, and which is essentially contiguous the moveable plate 272. With cordage 60 associated with each cord 50 extending through each of the slots 273—273, the movement of the plate 272 by the air cylinder 277 causes the blades 281—281 to sever the cordage.

It was mentioned hereinabove that the apparatus 270 included two cordage-severing devices 251—251 disposed adjacent one another with the cordage 60 extending between aligned slots 273—273 of the plates 272—272 of the associated devices. Dual severing devices 271—271 are used to avoid problems associated with what is referred to in the art as "suck-back". The severance of cordage under some slight tension will cause the conductors 51—51 to be moved slidably within the cord structure relative to the jacket such that the severed ends of the conductors are not contiguous to or flush with the severed end of the jacket. This undesired withdrawal or foreshortening of the conductors 51—51 occurs because of the development of tension in the cordage 60 as it is being wound on the mandrel 160. Hence, if the newly thus-formed leading end of the cordage was clamped to the associated mandrel in the next cycle of operation, an operator would have to separate that end portion of the jacket 56 extending beyond the conductors 51—51 prior to end finishing of the wound cord 50.

By using two of the devices 271—271, each of the wound cords 50—50 is severed from the supply in a delayed sequence of operation of the first of two air cylinders 277—277 after which the second air cylinder is operated to sever the cordage at a second location spaced a predetermined distance upstream from the first line of cut. The delay in time between the operation of the air cylinders 277—277 provides the necessary time for "suck-time" to occur. The predetermined distance is sufficient to separate out the portion of the jacket which has been vacated by the "suck-back" of the conductors. If the cylinders were operated simultaneously, the conductors 51—51 would withdraw disadvantageously within the newly formed leading end.

Cord Heating

Subsequent to the coiling of cordage 60 on each group of the mandrels 160—160, the conveyor 101 is indexed to advance each group in a counterclockwise direction, as viewed in FIG. 1, through dual heating stations 105 and 106. The heating stations 105 and 106 extend over six step positions on the conveyor 101 and include apparatus, designated generally by the numeral 300, for applying both inductive and radiant heat to the mandrels and to the wound cords 50—50, respectively.

The cords 50-50 coiled on the associated mandrels 160-160 are destined to be heated beyond the transition temperature of the plastic jacketing material thereby softening the plastic material and causing the plastic material to adjust to the coiled configuration. Subsequently, when the coiled cords 50—50 are cooled, the coiled configuration becomes permanent. The time required to carry out these steps is a function of the differences between the ultimate temperature of the heated cord and the transition temperature. The larger that difference, the shorter the cooling time. However, care must be taken in that excessively high temperatures could permanently damage the cords.

Of course, the temperatures to which the outwardly facing surfaces of the cords 50—50 and the mandrels 160—160 are heated are a function of the composition of the jacket 51, the insulation of the conductors 54—54, and the thickness of these materials.

The temperature difference across the cord 50 affects the quality of the finished retractile cord. In order to obtain optimum retractility of a coiled configuration, the entire cross section, and not just the outer surface of the cord 50, must reach the transition temperature during heating. Prior art heating of wound cordage appears to have been limited to heating of the outer surface of the convolutions or preheating the mandrels but not the combination thereof.

The preheating of the mandrels 160—160 and the infrared heating of the cord 50 cooperate to yield several desired advantages. The time required for heating effectively the cordage to impart a coiled configuration thereto is reduced. Further, the temperature differential across the cordage is reduced thereupon achieving a more uniformly heated cord.

In the first step position of one of the workholders 102—102, the mandrels 160—160 are heated inductively by coils 301—301, which are mounted adjacent the mandrels. The mounting of the coils 301—301 and the configuration thereof is accomplished to balance the heat input into each of the mandrels 160—160.

The coils 301—301 are comprised of a copper tube having cooling water flowing therethrough. The coils 301—301 are operated at 6000 volts and 350 RF amps of an alternating current source to establish a magnetic field which elevates the temperature of each of the mandrels 160—160. This is surprisingly effective in reducing the amount of lag of the temperature at the cord-mandrel interface behind that at the outwardly facing surfaces of the convolutions of the cords 50—50 and avoids overheating the outer surface of the cords in order to accomplish the cord heating within a short time span suitable for conveyor adaptation.

A radio frequency induction heating system operating in a range of frequency of 300–450 KHz is available commercially from Lipel Company of Long Island, New York. The range of frequency is selected to be suitable to heat only the material of the mandrels 160—160 and not the plastic material of the cords 50—50.

An apparatus, designated generally by the numerals 310, is operated to apply infrared heat to the coiled cordage 60 on each one of a group of mandrels. The apparatus extends over five steps in the conveyor 101. The apparatus 310 includes a housing 311, which encloses five banks 312—312 of heating elements 313—313.

The infrared heating elements 313—313 are available commercially for example from Research, Inc. of Minneapolis, Minnesota under the designation Pyropanel. Each of the infrared lamps of this apparatus is a tungsten-filament argon atmosphere lamp, which operates at approximately 1000° F at rated voltage. The apparatus 310 includes approximately ten to twelve lamps per bank, which covers approximately one foot along the conveyor 101. The infrared heating elements 313—313 are effective to elevate the temperature of the outwardly facing portion of the wound cords 50—50.

It should be understood that when one group of the mandrels 160—160 is in step 6 in the heating apparatus 300, being exposed to one of the banks 312—312 of infrared heat elements 313—313, successive groups of the mandrels are in steps two through five also being exposed to the infrared heat source. Moreover, another group is in the first step of advancement through the heating station 105 whereat the mandrels 160—160 thereof are being preheated inductively.

Further, as each workholder 102 is advanced by the conveyor 101 through the heating zone 106, provisions are made for causing each mandrel 160 to be turned so as to increase the uniformity of the heating.

The preheating of the mandrels together with the subsequent exposure of the cords 50—50 to infrared heat throughout the next successive five steps results in a more uniform temperature across the cordage 60. Although the prior art includes the exposure of the cordage to radiant or infrared heat or to the induction heating of the mandrels 106—160, it does not appear to be known to preheat inductively the mandrels followed by infrared exposure of the coiled cords. The mandrel 160 is preferably a solid rod but may be hollow.

The cooperation of the inductive preheat and of the radiant heating are effective to obtain rapid heating of the cords 50—50 to that temperature effective to heat set and thereby impart permanent retractility to the cords. This is accomplished in a time span which equates to a short distance along the conveyor 101 while avoiding undesirably excessive heating of the outwardly facing portions of the cords 50—50.

When exposed to a constant heat flux input at the outer surface, the cords 50—50 experience an initial heating transient after which the temperature increases at a constant rate and the temperature difference across the cord becomes constant. Although high radiant heat flux would facilitate high production, it unlike the cooperative inductive and radiant heating apparatus 300 undesirably increases the temperature variation across the cord 50.

Cord Cooling

Following the heating of the cord 50 coiled on each mandrel 160 in a group, the group is advanced on the conveyor 101 for a relative short distance, for example, one to two feet, through the ambient atmosphere and then through a cooling station 108 whereat the cord is exposed to high velocity chilled air. The cooling station 108 includes apparatus, designated generally by the numeral 330 and which is operated to move chilled air at a velocity in excess of 400 feet per minute across the surfaces of the convolutions of the cordage. This causes the temperature of the cord jacket 56 to be decreased.

It will be appreciated that the space-winding initially of the cordage 60 increases the efficiency of the infrared heating and air cooling of the cordage since not only are the outwardly facing surfaces of the flat cordage exposed but also side portions thereof. This is significant in providing the capability of heating and cooling the cordage within a short distance thereupon avoiding the need of a lengthy conveyor. Further, as noted hereinbefore, the spacing apart of the convolutions of each of the wound cords 50—50 avoids advantageously any possible adhesion of adjacent ones of the convolutions.

Mandrel Orientation

As mentioned hereinbefore, it is important to the cord removing that the mandrels 160—160, which are moved into the cord remove-reverse station 109 be oriented such that the trailing end portions of the cordage on each one thereof held by the portions 177—177 of the double clamp assemblies 170—170 are oriented downwardly. This is accomplished by a device, designated generally by the numeral 350 (see FIG. 12), as the mandrels are moved along by the conveyor 101 beyond the cooling zone 107.

In order to permit the device 350 to orient, if necessary, any mandrel 160, each workholder 102 is provided with an assist member 351 which is connected to and extends laterally of each workholder. As each workholder 102 is moved to the left as viewed in FIG. 12 by the conveyor 101, it is moved past a sloping face plate 352 attached to the frame 103. If the assist member 351 is depending downwardly, it is engaged by the sloping face plate 352, which is effective to turn the assist member 351 slightly in a counterclockwise direction, as viewed in FIG. 12, and as shown on the workholder 102 to the extreme right position in that view. This is effective to turn slightly the sprockets 133—133 and hence the mandrels 160—160.

Subsequently, in the next step of the advance of the conveyor 101, the workholder 102 comprising four mandrels 160—160 is moved into alignment with a U-shaped member 353, which is mounted slidably in a guideway formed between two overhang plates 354 and 356 and two base plates 357 and 358. The U-shaped member 353 is moved upwardly perpendicularly by an air cylinder 359, which is connected to U-shaped member through a piston rod 361.

Figure 12:
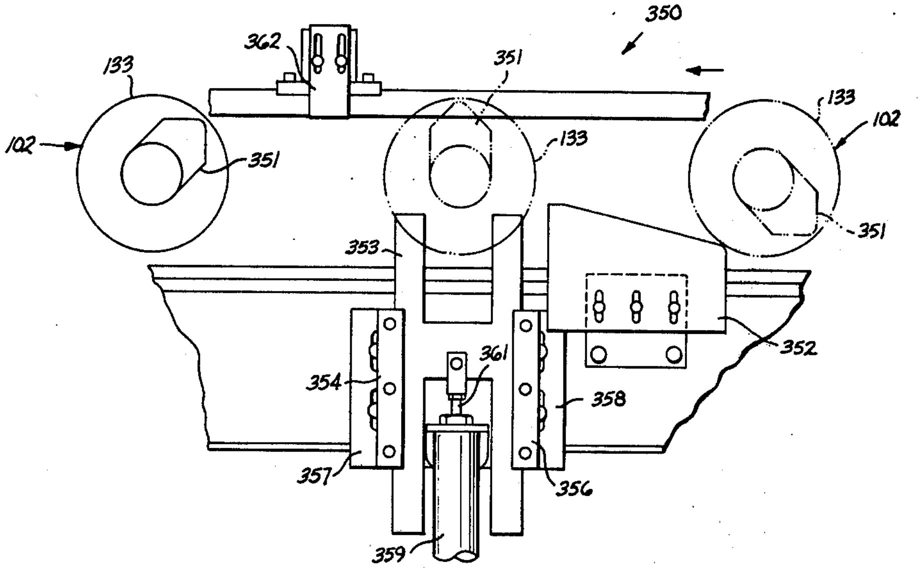
FIG. 12 is a detail view in elevation and showing a device for orienting each successive group of mandrels to facilitate removal of the cords therefrom.

The upward movement of the U-shaped member 353 to receive the mandrel between the legs of the U causes the assist member 351 to be engaged by the legs and moved to an upstanding position as shown in FIG. 12. Of course, the assist member 351 is not turned pivotally if it is already in the upstanding position. If the orienting device 350 included only the U-shaped member, the mandrels could possibly be misoriented. For example, if the assist member 351 were oriented downwardly prior to being aligned with the U-shaped member 353, it would remain so when the U-shaped member was moved about the workholder and mandrels 160—160 would be 180° out of the desired position. As will be recalled, the desired position is one selected such that the trailing end portion of the cord 50 is oriented downwardly to facilitate removal and reversal of the cord from the mandrel.

The next successive incremental advance of the conveyor 101 causes the assist member 351 to be advanced past a device 362, which is attached to the frame 103. Since the assist member 351 will have been priorly oriented upwardly, the device 362 turns the sprocket 133 clockwise as viewed in FIG. 12 to complete the orienting of the workholders 102—102 and hence of the leading and trailing ends of the coiled cords 50—50.

Remove-Reverse

Following the orientation of the mandrels 160—160 which insures that the trailing end portion of each wound cord in each group of mandrels is directed downwardly, the workholder 102 is advanced incrementally into the cord remove-reverse station 109 (see FIG. 1). At that station, each wound cordage, now heat set and cooled, is removed from its associated mandrel while the pitch of the helices thereof is reversed to improve the retractile properties of the finished cord 50.

The unwinding of each coiled 50 begins with the end thereof which was severed from the associated supply 60 at the cord-coiling station. It should be apparent that the clamp assembly 171 must be disengaged from engagement with the associated cordage. An apparatus, designated generally by the numeral 400, is particularly adapted to accomplish this function.

Figure 14:
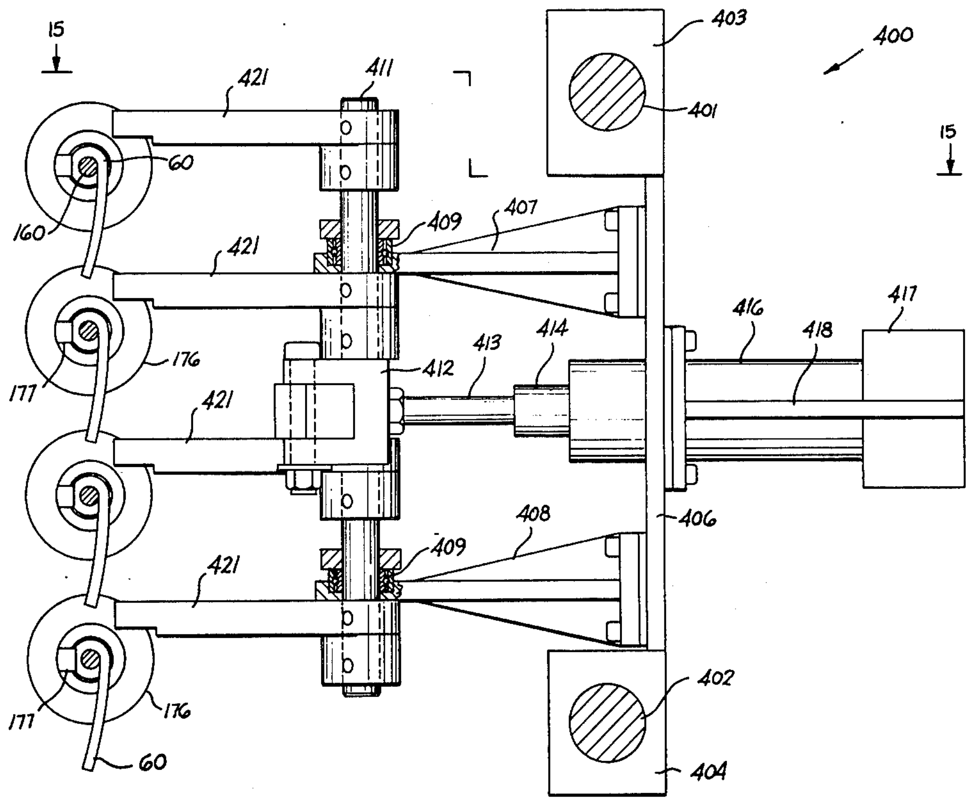
FIG. 14 is a view showing facilities for releasing the clamping facilities at the trailing end portions of the wound cordage.
Figure 15:
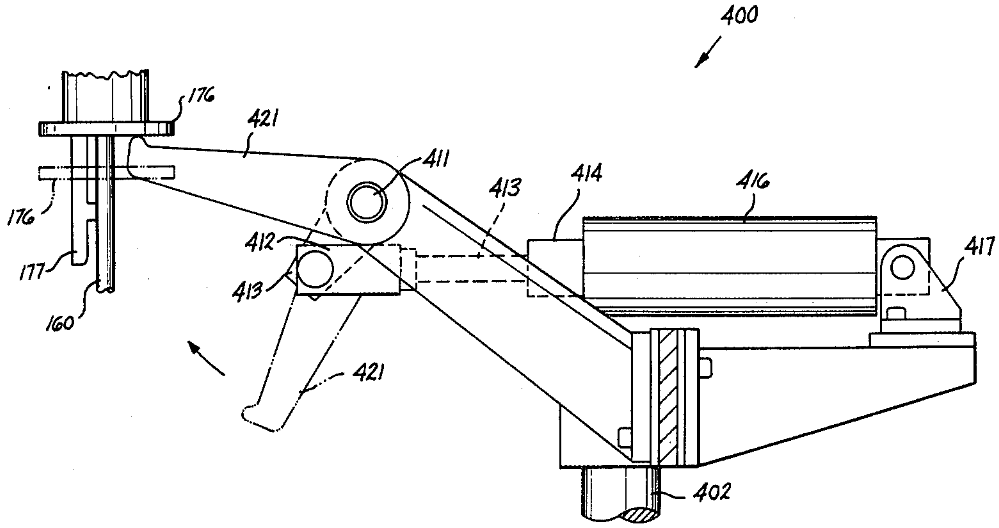
FIG. 15 is a view of the facilities of FIG. 14 taken along lines 15—15 thereof.

Referring now to FIGS. 14 and 15, it is seen that the apparatus 400 includes a pair of parallel support rods 401 and 402, disposed perpendicularly of the path of travel of the cords, which are mounted in blocks 403 and 404, respectively, supported from the general framework 103. A plate 406 extends between the rods 401 and 402 and has two brackets 407 and 408 cantilevered out therefrom. The brackets 407 and 408 support spaced bearings 409—409 through which extends a vertically disposed shaft 411.

The shaft 411 is adapted to be turned rotatably in the bearings 409—409. In order to accomplish this, a clevis 412 is attached to the shaft 411 and is pin connected to an extension 413 of a piston rod 414 of an air cylinder 416. The air cylinder 416 is mounted pivotally to a bracket 417 attached to a member 418 extending from the plate 406.

The shaft 411 has a plurality of pawls 421—421 extending laterally thereof, each of the pawls being associated with and disposed adjacent an associated one of the mandrels 160—160. The operation of the air cylinder 416 extends the piston rod 414 to turn the clevis 412 clockwise, as viewed in FIG. 13, which turns the shaft 411 and moves pivotally the pawls 421—421 in a clockwise direction. This causes the pawls 421—421 to engage a portion of the flange end of the flanged hub 176 to urge the portion 177 upwardly as viewed in FIG. 15. The sliding movement of the portion 177 moves it out of confining engagement of the last wound convolutions of the cordage 60. It will be recalled that each group of mandrels 160—160 comprising a workholder 102 are oriented by the turning thereof counterclockwise through a 90° angle (see FIG. 12) prior to being advanced into the remove-reverse station such that the trailing and leading ends of the cord are extending downwardly.

The trailing end portion of each cord 50, which is oriented downwardly, is grasped and then urged in a path outwardly of the apparatus 100 to unwind the cordage. In order to accomplish this, the apparatus 100 is provided with a remover-reverser, designated generally by the numeral 430. The remover-reverser, as can best be seen in FIG. 13, includes a plurality of pairs of jaws 431—431.

Figure 13:
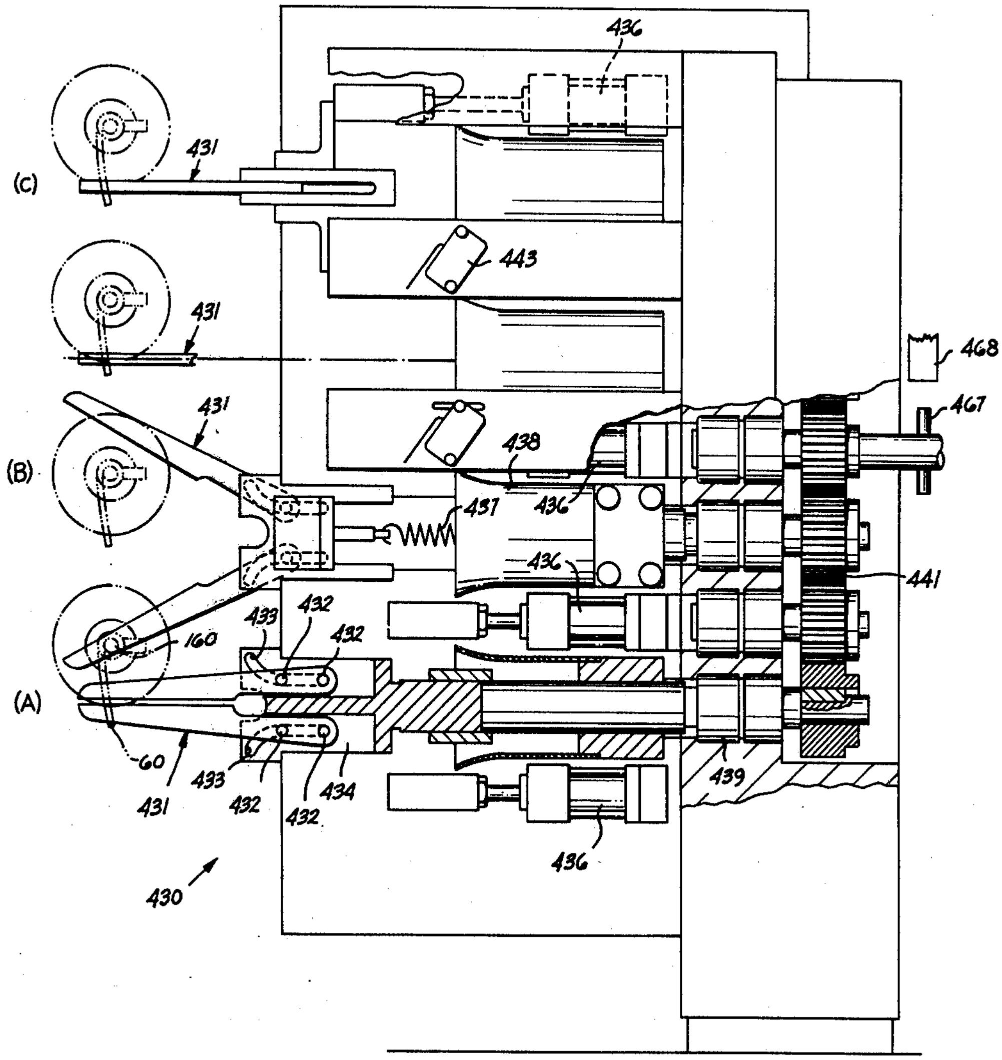
FIG. 13 is an enlarged view of a portion of the facilities for removing the cords from the mandrels and for reversing the pitch of the helices thereof with one of the devices associated with each of the mandrels of a workholder at that workstation, wherein position (A) is an enlarged view of a device for grasping the trailing end of an associated aligned wound cord, position (B) is a view of the device in position (A) with the device in an open position, and position (C) is a view of the device in position (B) relative to the associated cord wound on the associated mandrel.

FIG. 13 shows a pair of the jaws 431—431 and associated structure in various positions of the operation thereof. Each of the jaws 431—431 is attached to a pair of cam followers 432—432, which are received in a cam slot 433 and with one of the followers attached to a slidably mounted block 434. The slidably mounted block is moved by the operation of an associated air cylinder 436, which causes the one follower to be moved linearly within the associated slot while the other one of each set of the followers is moved along the arcuate portion of the associated slot to cause the jaw 431 to be moved pivotally to an open position, as shown in the FIG. 13(B) position.

It will also be seen in FIG. 13(B) that the block 434 is connected to a tension spring 437. This permits a spring return of the block 434 after the jaws 431—431 have been moved to a position with the trailing end portion of the cordage disposed between the open jaws. The spring return of the block 434 causes the movement of the followers 432—432 along the linear portion of the cam slots 433—433 thereupon causing the jaws 431—431 to be moved to a closed position and in clamping engagement with the trailing end portion of the cord therebetween.

Further, as can be seen in FIG. 13(B), the jaw assembly extends through a bellmouth guide tube 438 and is connected through an associated bearing assembly 439 to a drive gear 441 driven by a motor 442. Once the jaws 431—431 have closed upon the cordage 60, a limit switch 443 (see FIG. 13(B)) detects the cam closing and spring return of the block 434. This causes the operation of the motor 442 and concomitant turning of the jaws 431—431 and, simultaneously, the linear movement of the remover-reverser 430 away from the mandrels 160—160 for a predetermined distance.

The unwinding of the wound cord 50 from each of the associated mandrels 160—160 is accomplished desirably with a minimal amount of pull. Excessive pulling forces imparted to the cord will cause the cord to assume a stretched-out condition, which required undesirably additional amounts of expensive manufacturing floor space. Further, the imparting of excessive pulling forces to the coiled cordage as it is unwound causes desirably an enlarging of the helices and loss in retractility.

Figure 16:
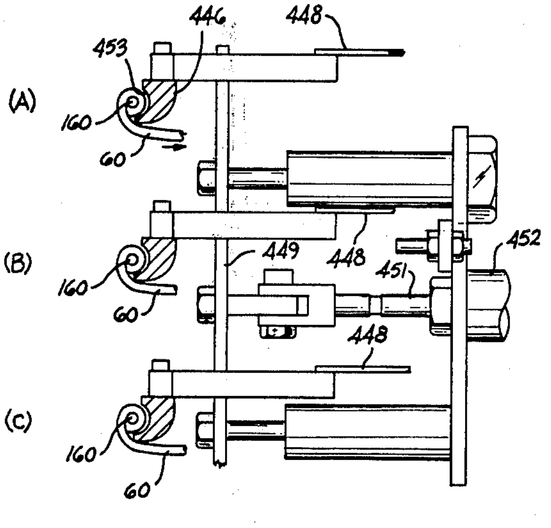
FIG. 16 is an enlarged view of a plurality of stripper bars in the cord-removal position for facilitating the removal of the cords with minimum pulling forces.

In order to overcome these potential problems and yet provide for the removal and the reversal of the cordage 60, the apparatus 430 includes a plurality of stripper bars 446, which are best seen in FIG. 16. One of the bars 446-446 is associated with and disposed in alignment with each one of the mandrels 160—160, which are advanced incrementally into the unwind position. The stripper bars 446—446 are mounted individually on associated arms 447—447 and 448—448 (see also FIG. 17) extending laterally from a post 449, which is moveable reciprocally by a piston rod 451 that is operated by an air cylinder 452. Once each group of mandrels 160—160 have been indexed into the unwind position, the air cylinder 452 is controlled to move the arms 447—447 and attached stripper bars 446—446 to position the stripper bars such that an arcuate surface 453 of the stripper bar is essentially contiguous the outwardly facing surfaces of the convolutions of the associated coiled cordage 60.

Then, when the jaws 431—431 are closed upon the trailing portions of the cordage, and the apparatus 430 moved out from the mandrels, successive sections of the cordage are in effect peeled off the mandrel 160 (see FIG. 16 (A)). This has been found to facilitate removal and reversal of the pitch of the helices with nominal tension while holding any enlargement of the convolutions desirably to a low amount, if any, over that as it existed on the mandrels.

The remove-reverse apparatus 430 also has provisions for moving the jaws 431—431 in a direction away from the associated mandrels 160—160 simultaneously with the rotation of the jaws and the rotation of the mandrels. The movements cooperate to reverse the pitch of the helices in each length of the cordage 60 and to produce a cord 50 having superior retractile properties. Some prior art facilities accomplish this by unwinding the convolutions from the original coiling mandrel and rewinding the convolutions with a reverse pitch onto another mandrel. This requires additional mechanisms and requires provisions for being able to remove the finally wound cordage 60 from its associated mandrel 160. See U.S. Pats. Nos. 2,575,747 and 3,226,767, for example.

Figure 17:
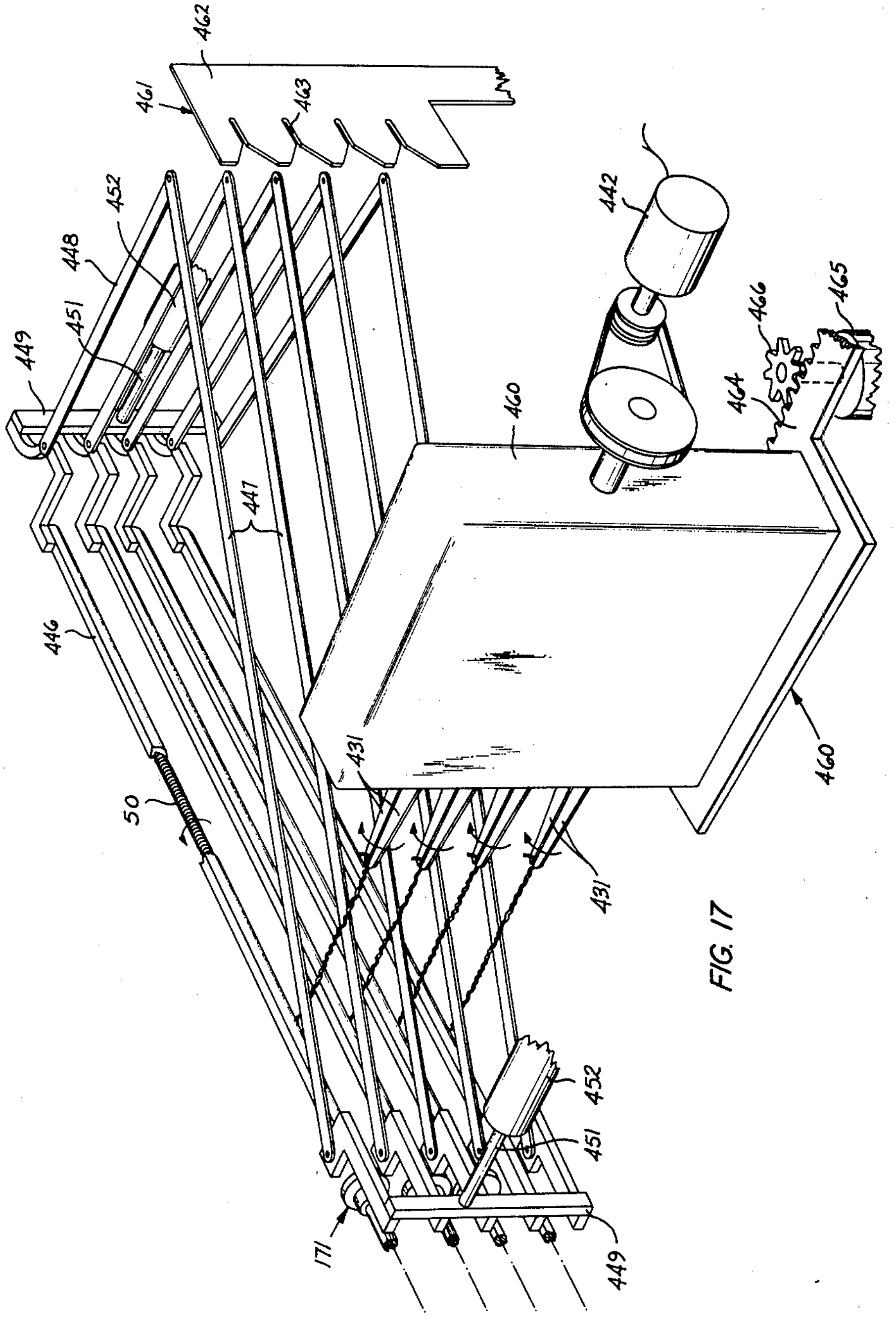
FIG. 17 is a perspective view of the cord removal and reversing facilities.

Referring now to FIG. 17, it is seen that the rotatably mounted jaws 431—431 are mounted on a carriage, designated generally by the numeral 460. The carriage 460 is mounted to be moved with a rack 464 in a direction angularly laterally of the mandrels 160—160. As the carriage 460 is moved with the rack 464, each wound cordage 60 is removed from the associated mandrel and moved through adjacent ones of the arms 447—447. A predetermined amount of overtwist may be imparted to each of the cords. See, for example, U.S. Pat. No. 3,656,516, incorporated by reference hereinto.

When the trailing portions are removed from the mandrels 160—160, the cord 50 has a tendency to knot and kink up individually and tangle with adjacent cords. Provisions must be made to secure the trailing end portions as the trailing end portions are unwound from the mandrels.

As the carriage 460 approaches an outer end limit of its travel, the carriage is moved adjacent a confining device 461 in the form of a plate 462 mounted vertically and having a plurality of slots 463—463 formed therein. Further movement of the carriage 460 angularly laterally of the mandrels causes portions of the cordage being unwound from the mandrels to be moved into and through associated aligned ones of the slots 463—463. Each of the slots 463—463 has a flared entrance to facilitate the movement of portions of a cord 50 into the slot. The width of the slot 463 is slightly greater than the diameter of the cord when the cordage is in an extended taut condition and is less than the diameter of the convolution of the cord in a retracted condition but is greater than the diameter of the cordage 14.

The principles of the confining device 461 are disclosed in U.S. Pat. No. 3,656,516 issued Apr. 18, 1972 in the name of E. C. Hardesty and incorporated by reference hereinto. However, in the apparatus of the present invention, the arrival of the carriage 460 at the end of the path of travel along the rack 464, is accompanied by the operation of the air cylinders 436—436 to cause the jaws 431—431 to be opened to release the trailing ends of the wound cords 50—50. The retention of the leading ends of the cords 50—50 within the associated ones of the slots 463—463 in the plate 462 holds the cords and prevents entanglement until an operator removes the cords. Advantageously, this is the only role played by an operator in the manufacture of the retractile cords other than to monitor the control of the operation.

Figure 18:
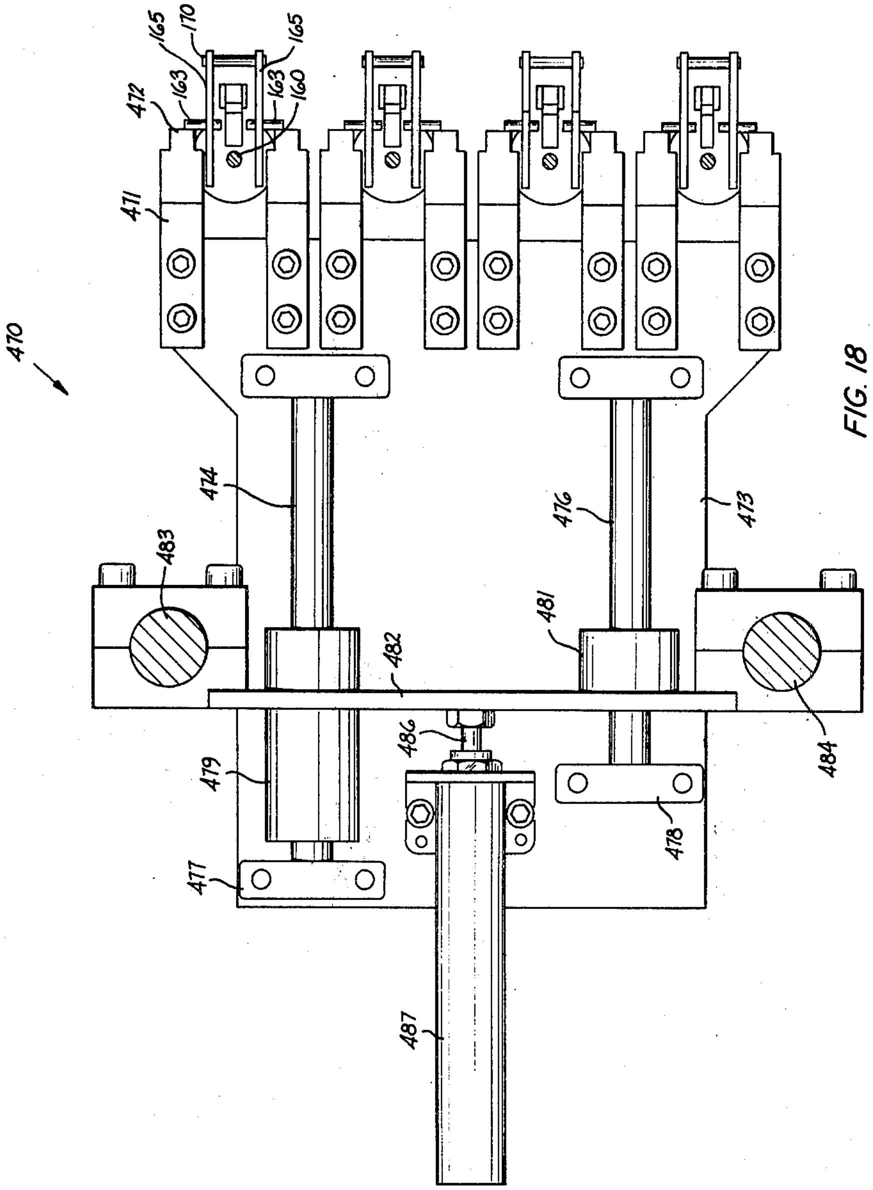
FIG. 18 is a side elevational view of a portion of the removal facilities and showing a device for releasing the cord-leading end clamping facilities.

Referring now to FIG. 18, there is shown a device 470 in the cord-removal and reversing station 109 for causing the toggle clamp assemblies 154—154 to release the leading ends of the cords 50—50 wound on the mandrels 160—160. A plurality of spaced members 471—471 having stepped ends 472—472 are attached to and extend from a support plate 473. The support plate 473 has a pair of rods 474 and 476 mounted in end brackets 477 and 478, respectively. The rods 474 and 476 extend through sleeve bearings 479 and 481, respectively, which are held in a plate 482 that is connected to support rods 483 and 484. The plate 482 is connected to one end of a piston rod 486 extending from an air cylinder 487 that is fastened to the plate 473.

As can best be seen by viewing FIGS. 3 and 18, the operation of the air cylinder 487 with the piston connected to the stationary plate 482 causes the plate 473 to be moved to the right as viewed in FIG. 18 to move the adjacent stepped ends of the members 471—471 into engagement with the studs 163—163 extending from the crank cams 161—161 of each of the mandrels 160—160. This causes the crank arms 161—161 to be turned in a counterclockwise direction, as viewed in FIG. 3, to move the ends 169—169 out of engagement with the leading ends of the cords 50—50.

Operation

Figure 19:
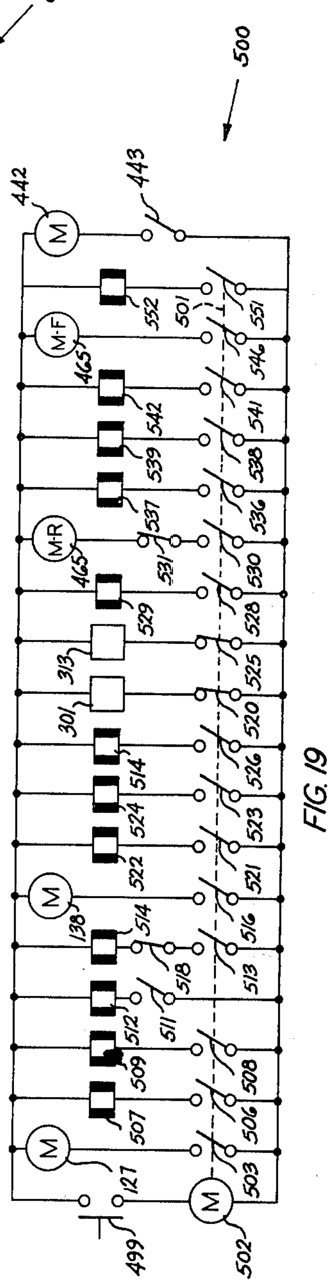
FIG. 19 is an electrical control circuit for the apparatus.

Initially, an operator inserts a leading end of each supply 61 of the cordage 60 into one of the cord-feeding devices 201—201 of which in a preferred embodiment there are four and depresses START palmbutton 499 to initiate the operation of an electrical control circuit, designated generally by the numeral 500 (see FIG. 19). After the initiation of the operation of the apparatus 100, it continues until a stop button (not shown) is depressed or malfunction occurs.

Prior to the initiation of the operation of the apparatus 100, all of the elements of a pneumatic control system, designated generally by the numeral 600 (see FIG. 20) must be in predetermined positions. If any of the elements are not in a BEGIN position, the operator is made knowledgable thereof through appropriate signals and the positions assumed prior to the beginning of the automatic continuous operation of the apparatus 100.

It should be recognized that the apparatus 100 includes a plurality of work stations whereat a sequence of operations occur sequentially continuously as groups of mandrels 160—160 are loaded and then stepped incrementally through the apparatus on the endless conveyor 101. In each station where multiple worksteps occur, each successive step occurs only if the preceding step had taken place. The sequence of operation is controlled by the electrical circuit 500, which includes a turning mechanism, designated generally by the numeral 501, which is provided with a motor 502. The motor 502 operates a camming system (not shown) whereby a plurality of contacts of the timing mechanism are cam-controlled, thereby energizing a plurality of solenoids to control the operation of the apparatus 100. It should be understood that this control system is exemplary only and others may be used in order to control the operation of the apparatus in accordance with the principles of this invention.

Figure 20:
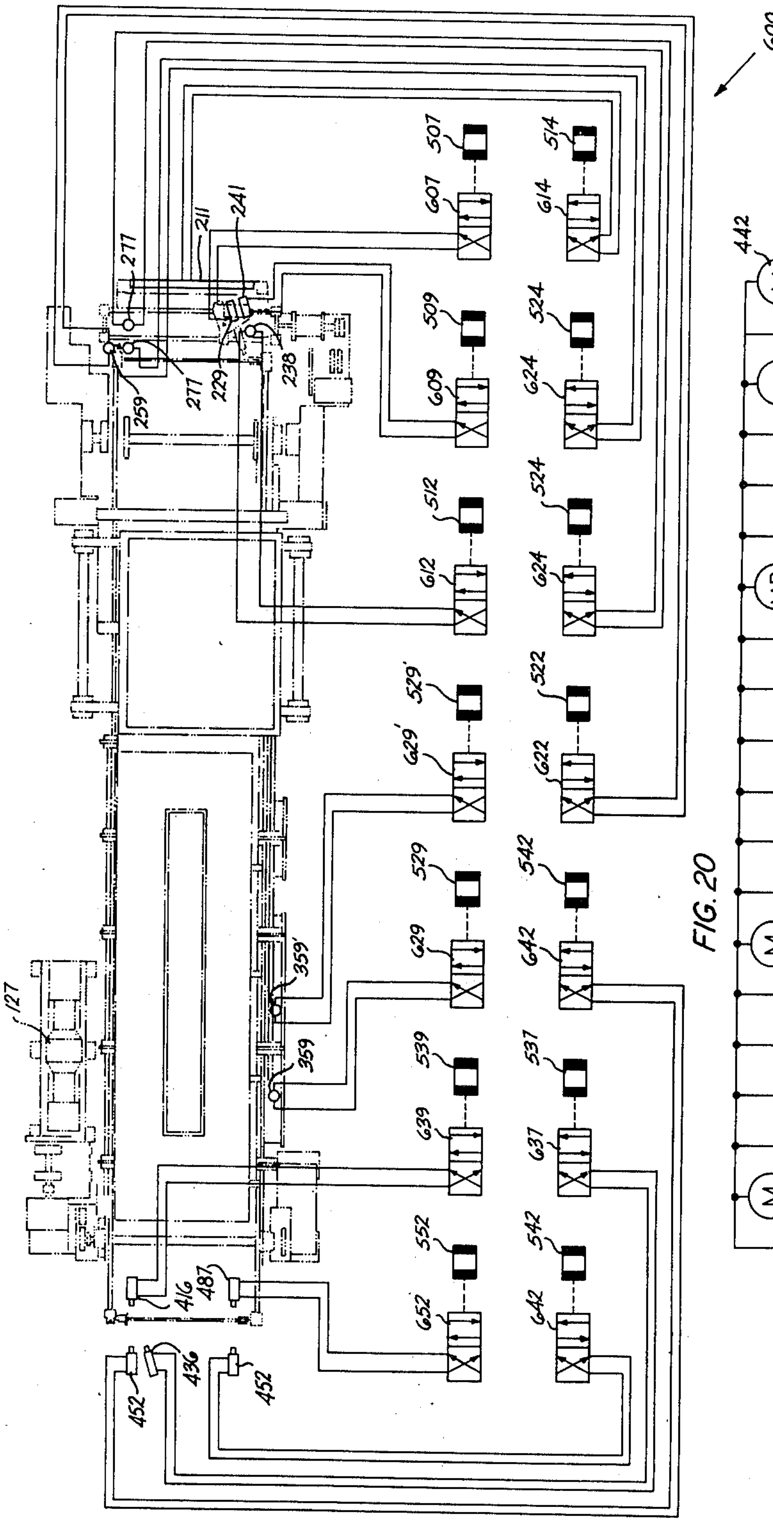
FIG. 20 is a schematic view showing a pneumatic control system for the assembly apparatus.

The following operational description is illustrative of the operation of the various controlling air cylinders and motors for the apparatus. Referring to FIGS. 19 and 20, all air cylinders are assumed to be in an unoperated REST position. Thereafter the rotational movement of the motor 502 results in the cam closing of a contact 503 (see FIG. 19) of the timing mechanism.

The contact 503 may be time or cam actuated to control the movement of the conveyor 101 and the workholders 102—102 through the workstations. Initially, it may be assumed that the closing and opening of the contact 503 causes the operation of the motor 127 to advance successive ones of the workholders 102—102 into the cord-coiling station 104 where the workholders dwell for a time sufficient to have a predetermined number of convolutions coiled thereon and severed from the supplies 61—61.

This is followed by the closing of a contact 506 and energization of an associated solenoid 507, which causes pneumatic pressure to be applied through a valve 607 to operate the air cylinders 229—229 (see FIGS. 3 and 6) to move the pawls 225—225 and the anvils 226—226 of the feed nozzles 222—222 into juxtaposition with the toggle clamp assemblies 154—154. Leading ends of the cordage supplies 61—61 are advanced into engagement with the associated mandrels 160—160 and extend transversely thereof (see FIG. 5).

Then a contact 508 is closed to energize an associated solenoid 509 to cause pneumatic pressure to be applied through a valve 609 to operate the air cylinder 241. This causes the rack 236 to be moved adjacent the toggle clamp assemblies 154—154 (see FIG. 9). The linear movement of the rack 236 causes the operation of a limit switch 511, which causes air to be supplied through a valve 612 to operate the air cylinder 238. The operation of the air cylinder 238 is controlled to move the rack 236 linearly as shown in FIG. 8 to rotate the pinions 234—234 and associated cranks 231—231. The cranks 231—231 are moved pivotally to engage the portions 165—165 of the arms 161—161 of the toggle clamp assembly 154—154 (see FIG. 4(A)). This causes the arms 161—161 to be turned on the associated shafts 162—162 clockwise as shown in FIG. 4 to the position of FIG. 4(B) to move the ends 169—169 to clamp the leading end portions of the cordages 60—60 in engagement with the mandrels 160—160.

While the cam associated with the contact 503 is still in a dwell position, the turning of the motor 502 causes the switche 508 to be opened to return the cylinder 241 to an unoperated condition and thereby move the rack 236 laterally of the mandrels 160—160. The movement laterally of the rack 236 disengages the rods from the limit switch 511 causing the cylinder 238 to return the crank arms 231—231 to an unoperated position.

The turning of the motor 502 causes the contact 506 to be opened thereupon deenergizing the solenoid 507 and causing the valve 607 to control the air cylinders 229—229 to withdraw the feed nozzles 222—222 from adjacent the mandrels 160—160. The snubber 233 cooperates with the block 224 to prevent retrograde movement of the cordage 60 toward the supplies 61—61 thereof in the event that the leading ends have not been secured to associated ones of the mandrels.

Then a switch 513 is cammed closed to energize the operation of the cable cylinder 211 (see FIG. 3) to cause the carriage 202 to be moved with the follower 216 along the cam slot 217. Simultaneously, a switch 516 is closed to cause the operation of the motor 138 (see FIG. 1) to cause the mandrels 160—160 to be turned rotatably. The turning of the mandrels 160—160 cooperate with the movement of the carriage 202 longitudinally laterally of the mandrels to cause a plurality of spaced-apart convolutions of the cordages 60—60 to be wound on the associated mandrels 160—160.

After a predetermined movement of the carriage 202 along the path defined by the cam slot 217, the carriage engages a limit switch 518 (see FIG. 3), which causes a discontinuation of the operation of the cable cylinder 211 to move the carriage to the right as viewed in FIG. 3. Then a switch 521 is closed to cause the operation of the ROTAC motor 259 to turn the shaft 254 and thereupon engage the fingers 251—251 with the associated ones of clamp assemblies 171—171 (see FIGS. 9 and 10). This causes a sliding movement to be imparted to the portions 177—177 to move those portions over the last one or ones of the convolutions of the cordages 60—60 on each of the mandrels 160—160.

Subsequently, a switch 523 is closed to energize an associated solenoid 524 to cause pneumatic pressure to be applied through valves 624—624 to air cylinders 277—277. This causes an operation of the severing apparatus 270 to move the plates 272—272 and blocks 281—281 to sever the cordage 60 extending from each mandrel 160 into the associated feed nozzle 222 in two spaced locations to avoid the hereinbefore described problem of "suck-back". The severance of the cordage 60 from that wound on the mandrel 160 permits the retractile properties of the cord 50 to whip the trailing end portion about the mandrel through a 180° angle to the position shown in FIG. 9 where advantageously it remains with the convolutions held by the portions 177—177 against further unwinding.

The switch 523 is opened to deenergize the solenoid 254 and cause the air cylinders 277—277 and associated severing apparatus to be returned to then unoperated positions. Moreover, a switch 526 is closed to initiate the operation of the cable cylinder 211 in a reverse direction to return the carriage 202 to the left as shown in FIG. 3 in preparation for coiling cordage 60 on the mandrels of the next successive workholder 102 indexed into the cord-coiling position.

The switch 503 is closed to operate the motor 127 to move the just-loaded workholder 102 in a counterclockwise direction, as viewed in FIG. 1, to a first step of the plurality of steps in the cord-heating station 107. At that time, of course, although this description is made with reference to one workholder 102 the loading of which has just been described, it will be understood that successive ones of the workholders are advanced into the workstation 104 and loaded with cordage 60.

In the first step of the cord heating station 107, a switch 520 is closed to cause the coils 301—301 which are positioned over the mandrels 160—160 and operated to heat inductively the mandrels. Of course, this causes the initiation of the heating of the wound cordage 60 on each of the mandrels. After a predetermined time which, of course, coincides with the conclusion of the loading of the mandrels 160—160 now in the cord-loading position, the switch 503 is reclosed to again operate the motor 127 and index the workholder 102 under consideration into the first of a plurality of stations in the cord-heating zone 107 where the mandrels are exposed to the infrared head device 310 within the housing 311. This causes a heating of the exterior outwardly facing surfaces of the convolutions of the cord 50. The infrared heating supplemented by the induction heating of the mandrels causes a bidirectional heating of the cordage to thereby more effectively heat the cordage within a short distance of travel.

Through subsequent openings and closings of the switch 503, the conveyor 101 is indexed to advance incrementally the workholder 102 through each of the work stations in the chamber 311 to complete the infrared heating of the cords to set the configuration thereof on the mandrels 160—160.

Further, openings and closings of the switch 503 causes the workholder to be advanced incrementally a short distance through the ambient atmosphere and then into and through the cooling chamber 330 where facilities cause chilled air at a relatively high velocity to be moved into engagement with the cord 50 to cool the cordage to permit further processing thereof.

A subsequent advance of the conveyor 101 moves each of the mandrels 160—160 of the workholder past the orienting device 300 (see FIG. 12) such that the plate 352 insures that each assist 351 is angled to a vertical axis and as shown in FIG. 12. Then a switch 528 is closed to engage a solenoid 529 and cause air to be supplied through a valve 629 to the air cylinder 359 to move the U-shaped member upwardly to turn the mandrel, if necessary, to the required oriented position to prepare mandrels of that workholder 102 for a final turn by the device 362 to orient the cordage 60 to have the trailing end thereof grasped. Moreover, a cylinder 359' at the return leg of the conveyor 101 is operated to reorient the workholder 102 prior to advance thereof into the cord loading position for a subsequent cycle of cord winding.

Further, cam-timed openings and closings of the switch 503 cause the workholder 101 to be advanced incrementally into the cord remove-reverse position 109. A switch 530 is closed to cause the carriage 460 to be moved toward the workholder 102 in the removal position until a limit switch 531 (see FIG. 13) is operated. This discontinues the movement of the carriage with each of the sets of jaws 431—431 justaposed about the associated trailing end of cordage (see FIG. 13(C)).

At that time the trailing and leading ends of the cordage 50—50 are oriented downwardly. A switch 536 is closed to energize a solenoid 537 to cause pneumatic pressure to be supplied through a valve 637 to the air cylinder 436 to withdraw the jaws 431—431 into the guides 438—438 to close the jaws on the trailing end portions of the cords 50—50. After the trailing end portions have been grasped, a switch 538 is closed to energize a solenoid 539 to supply pneumatic pressure through a valve 639 to the cylinder 416. This moves the pawls 421—421 pivotally to move slidably the portions 177—177 of the clamp assemblies 171—171 to uncover the last-wound convolution of each cord 50.

Then a switch 541 is cam-closed to energize a solenoid 542 to cause a valve 642 to control the cylinders 452—452 to move the stripper bars 446—446 in proximate engagement with the wound cords 50—50 (see FIG. 16).

Then a switch 546 is cammed closed to a motor 465 to move the carriage 460 along the rack 464 (see FIG. 17) from the conveyor 101 to unwind the cords 50—50 with the successive sections of the cordage being moved under the stripper bar 446. As the motor 465 turns the pinion 466, the carriage 460 is moved longitudinally orthogonally of the mandrels 160—160 while the jaws 431—431 are being turned rotatably. The stripper bars 446—446 facilitate unwinding with minimum pulling forces and thereby avoid undesired enlargement of the convolutions.

As each cord 50 is unwound from the associated mandrel 160, successive sections are moved axially and generally perpendicularly of the plate 462. Then as the carriage approaches the end of its travel, portions of the cordage adjacent the trailing end portions are moved into the flared entrance portions 464—464 of the slots 463—463.

Then a switch 551 is closed to energize a solenoid 552 to cause a valve 647 to control air cylinder 487 to cause the members 471—471 (see FIG. 18) to engage the other end portions 165—165 of the toggle clamp assemblies 154—154 to release the leading end portions of the cords 50—50.

The continued motion of the carriage 460 causes the last few convolutions bo be unwound from each mandrel 160 and portions of the cordage moved through the associated slot 463 toward the inner closed end thereof.

The friction engagement of segments of each cord 50 with the bottom wall of the slots 463—463 exerts a drag therein and permits the last few convolutions to expand to the original diameter thereof. The trailing end portions of the cordage 60 engages the walls of the slots 463—463 to hold the cordage.

At the end of the predetermined path of travel of the carriage 460, the switch 546 is opened, which causes a discontinuation of the operation of the motor 465 and hence the movement of the carriage. The switch 536 is opened to cause the air cylinder 436 to be operated to open the jaws 431—431 to release the ends of the cords 50—50 after which an operator removes the cords from the plate 462.

Then the switch 530 is closed to cause the motor 465 to turn in a reverse direction to return the carriage 460 to a position adjacent the cord-unloading or removal-reverse position for another cycle of operation with the next successive group of mandrels 160—160. As the carriage 460 is returned along the rack 464, the jaws 430—430 are caused to be turned rotatably and a slot pin 467 is operated to an extended position until it engages a stop 468 whereupon the jaws are oriented for the next cycle.

Subsequently, the conveyor is indexed and on its return to the cord-coiling position 104, the workholder 102 just unloaded is moved through a second orienting device 370 identical to the device 350 but on the lower return leg of the conveyor (see FIG. 1). This is operated to orient the clamp assemblies 150 and 170 to be positioned properly to clamp leading and trailing end portions of cordage 60 once the workholder is reindexed into the cord-coiling position 106.

It is to be understood that the above-described arrangements are simply illustrative of the invention. Other arrangements may be devised by those skilled in the art, which will embody the principles of the invention and fall within the spirit and scope thereof.

What is claimed is:

1. A method of making retractile cords each having a jacketed plurality of individual conductors, which includes the steps of:

providing a plurality of elongated workholders in spaced-apart parallel relationship to one another along a continuous path of travel substantially normal of the longitudinal axes of the workholders;

advancing a leading end of a supply of cordage into engagement with one of the workholders in registration with a cord-loading work station;

securing the leading end of the supply of cordage in engagement with each successive workholder in the cord-loading work station;

winding a plurality of convolutions of the cordage on successive ones of the workholders in registration with the cord-loading work station to form a helically wound cord on each successive workholder such that adjacent ones of the convolutions are spaced apart and the wound cord has inwardly and outwardly facing portions with respect to its associated workholder;

clamping the last wound convolution in engagement with the workholder;

severing the wound cord from the supply of cordage to form a trailing end portion extending from the workholder and a leading end portion from the supply such that the trailing and leading end portions each includes jacketed conductors;

indexing each successive loaded workholder along the path of travel while simultaneously moving successive empty ones of the workholders into the cord-loading work station;

heating each successive loaded workholder to facilitate heat transfer from the workholder generally conductively into the inwardly facing portions of the convolutions, and causing radiant heat transfer into the outwardly facing portions of the convolutions of the cords on successive ones of the workholders while simultaneously winding cordage on the next successive ones of the workholders in the cord-loading work station;

cooling the cord wound on each successive one of the loaded workholders to facilitate removal subsequently of the cord from the workholder;

interposing a guide surface adjacent the wound portions of the cord on each successive one of the workholders in a cord removal work station;

twistingly rotating the ends of the helically wound cord on each successive one of the workholders in the cord removal work station relative to each other to reverse the direction of the pitch of the helices thereof; while causing relative movement between the trailing end and the wound portion of each successive one of the wound cords to unwind the cord form the workholder with successive sections of the cord being moved past the guide surface to minimize enlargement of the convolutions; and engaging unwound portions of the cord adjacent to the other end of the cord prior to the cord being unwound completely to secure the other end of the cord when the cord is unwound completely.

2. The method of claim 1, wherein the severing of the wound cord from the supply is accomplished by severing the cordage at two spaced locations intermediate the wound cord and the supply of cordage whereby the newly formed leading end portion of the cordage includes end faces of the individual conductors generally flush with the end face of the jacket.

3. The method of claim 1, wherein each of the cords is wound on a mandrel, and the heating of the mandrels is accomplished electrically inductively, the heating of the cords is accomplished subsequently by radiant heat transfer, and the cooling of the cords is accomplished by convective heat transfer.

4. The method of claim 1, wherein each workholder includes a plurality of mandrels and the cordage is wound in spaced-apart convolutions simultaneously on each of the plurality of mandrels of each successive one of the workholders in the cord-loading position by moving the cordage extending to the supply laterally of the workholder while turning rotatably the workholder.

5. A method of making retractile cords from a supply of cordage, comprising the steps of advancing a plurality of elongated rotatable workholders in spaced parallel relationship along a continuous path normal to the elongated workholders through a cord-loading station, a heating station, a cooling station and a cord removal-reversal station;

winding helically a plurality of spaced-apart convolutions of cordage from a supply on each empty workholder in response to the positioning thereof at the cord-loading station, the wound cordage having inwardly and outwardly facing portions with respect to the associated workholder, further, the cordage wound on each workholder having leading and trailing unwound end portions which extend from the workholder in the same direction;

severing the cordage wound on each of the workholders from the supply while the workholder is in the cord-loading position;

heating each successive loaded workholder to facilitate heat transfer from the workholder generally conductively into the inwardly facing portions of the convolutions, and causing radiant heat transfer into the outwardly facing portions of the convolutions of the cords on each successive loaded workholder while simultaneously winding cordage on at least one empty workholder in the cord-loading station;

cooling the cordage wound on the loaded workholders as the workholders are moved through the cooling station;

turning each workholder about its longitudinal axis, if necessary, in order to orient the leading and trailing unwound end portions of each cord in a predetermined direction to facilitate removal of the wound cord from the workholder;

removing the wound cordage from each associated workholder at the removal-reversal station in a manner to reverse the pitch of the helices of the convolutions of the wound cordage while minimizing enlargement of the helices thereof; and preventing entanglement of the convolutions of the cordage wound on each workholder prior to complete removal thereof from the associated workholder at the cord removal-reversal station.

6. The method which includes the steps of claim 5 and further which includes prior to the step of winding the convolutions of cordage on an empty workholder in the cord-loading station the step of advancing and securing the leading end of the supply of cordage to the empty workholder in the cord-loading station.

7. The method of claim 5 wherein the heat transfer into the outwardly facing surfaces of the convolutions of each is accomplished subsequent to the heating of each of the workholders.

* * * * *

UNITED STATES PATENT AND TRADEMARK OFFICE

Certificate

Patent No. 4,075,299 Patented February 21, 1978

Gordon Foreman Bloxham, Claude Paren Brezeale, Eugene Raymond Cocco, Edwin Charles Hardesty, Byron Lee Small, Daniel Marion Steinert and Charles McGonical Application having been made by Gordon Foreman Bloxham, Claude Paren Brezeale, Eugene Raymond Cocco, Edwin Charles Hardesty, Byron Lee Small, Daniel Marion Steinert and Charles McGonical, the inventors named in the patent above identified, and Western Electric Company, Incorporated, New York, New York, a corp. of New York, the assignee, for the issuance of a certificate under the provisions of Title 35, Section 256, of the United States Code, adding the name of Michael Alfred Cole as a joint inventor, and a showing and proof of facts satisfying the requirements of the said section having been submitted, it is this 17th day of March 1981, certified that the name of the said Michael Alfred Cole is hereby added to the said patent as a joint inventor with the said Gordon Foreman Bloxham, Claude Paren Brezeale, Eugene Raymond Cocco, Edwin Charles Hardesty, Byron Lee Small, Daniel Marion Steinert and Charles McGonical.

FRED W. SHERLING,
*Associate Solicitor.*